United States Patent [19]
Lightfoot et al.

[11] Patent Number: 5,748,493
[45] Date of Patent: May 5, 1998

[54] LEVEL 1 GATEWAY FOR VIDEO DIAL TONE NETWORKS

[75] Inventors: Regina Lightfoot, New Carrollton, Md.; William Goodman, Collegeville, Pa.

[73] Assignee: Bell Atlantic Network Services, Inc., Arlington, Va.

[21] Appl. No.: 677,294

[22] Filed: Jul. 9, 1996

Related U.S. Application Data

[62] Division of Ser. No. 304,174, Sep. 12, 1994.

[51] Int. Cl.$^6$ .................................................. H04N 7/10
[52] U.S. Cl. ........................... 364/514 C; 348/6; 348/7; 348/10; 455/3.1
[58] Field of Search ................. 364/514 A, 514 B, 364/514 C, 514 R; 348/6, 7, 10, 13, 487; 455/3.1, 4.2, 6.3

[56] References Cited

U.S. PATENT DOCUMENTS

| | | | |
|---|---|---|---|
| 4,829,372 | 5/1989 | McCalley et al. | 358/86 |
| 4,949,187 | 8/1990 | Cohen | 358/335 |
| 4,963,995 | 10/1990 | Lang | 358/335 |
| 4,995,078 | 2/1991 | Monslow et al. | 380/10 |
| 5,027,400 | 6/1991 | Baji et al. | 380/20 |
| 5,038,211 | 8/1991 | Hallenbeck | 358/142 |
| 5,051,822 | 9/1991 | Rhoades | 358/86 |
| 5,057,932 | 10/1991 | Lang | 358/335 |
| 5,089,885 | 2/1992 | Clark | 358/86 |
| 5,093,718 | 3/1992 | Hoarty et al. | 348/7 |
| 5,104,125 | 4/1992 | Pocock et al. | 273/157 R |
| 5,130,792 | 7/1992 | Tindell et al. | 358/85 |
| 5,132,992 | 7/1992 | Yurt et al. | 375/122 |
| 5,133,079 | 7/1992 | Ballantyne et al. | 455/4.1 |
| 5,136,411 | 8/1992 | Palk et al. | 395/125 |
| 5,172,413 | 12/1992 | Bradley et al. | 380/20 |
| 5,181,107 | 1/1993 | Rhoades | 358/86 |
| 5,195,092 | 3/1993 | Wilson et al. | 370/94.2 |
| 5,208,665 | 5/1993 | McCalley et al. | 358/86 |
| 5,220,420 | 6/1993 | Hoarty et al. | 358/86 |
| 5,231,493 | 7/1993 | Apitz | 358/176 |
| 5,247,347 | 9/1993 | Litteral et al. | 358/85 |
| 5,253,275 | 10/1993 | Yurt et al. | 375/122 |
| 5,283,639 | 2/1994 | Esch et al. | 348/6 |
| 5,414,455 | 5/1995 | Hooper et al. | 348/7 |
| 5,442,390 | 8/1995 | Hooper et al. | 524/425 |
| 5,477,263 | 12/1995 | O'Callaghan et al. | 348/7 |
| 5,479,202 | 12/1995 | Beriont | 348/7 |
| 5,481,542 | 1/1996 | Logston et al. | 370/94.2 |
| 5,488,412 | 1/1996 | Majeti et al. | 348/10 |

OTHER PUBLICATIONS

Request for Quotation No. 93JJMO242 for Bell Atlantic's Full Service Network, Dec. 7, 1993.

*Primary Examiner*—Emanuel T. Voeltz
*Assistant Examiner*—Patrick Assovad
*Attorney, Agent, or Firm*—Lowe, Price, LeBlanc & Becker

[57] ABSTRACT

In advanced digital networks for providing selective point-to-point communications between subscribers terminals and broadband server equipment operated by a plurality of independent information service providers, routing through the network is controlled by functionality identified as a Level 1 Gateway. The Level 1 Gateway will perform a variety of functions including communications port management of transmissions of information between subscribers and servers, processing of billing information and session management. The Level 1 Gateway generates menus of providers, either as a function of providers available through a particular portion of the network or in a customized fashion specified by individual subscribes. The Level 1 Gateway may also provide a PIN number functionality, e.g. to permit parents to limit which providers their children can access. The Level 1 Gateway is itself an interactive device in that subscribers can input information and receive display information from the Gateway to define or modify their own video dial tone service through the network.

11 Claims, 13 Drawing Sheets

FIGURE 2A

```
*********************
*   PLEASE  CALL     *
*   1-800-###-####   *
*   TO SUBSCRIBE TO  *
*   BELL ATLANTIC    *
*   VIDEO DIAL TONE  *
*       SERVICES     *
*********************
```

FIGURE 2B

```
*********************
*     YOUR VIDEO     *
*      PROVIDER      *
*    PREFERENCE IS   *
*   NOT RECOGNIZED   *
*     -----------    *
*    PLEASE STANDBY  *
*    FOR A MENU OF   *
*   VIDEO PROVIDERS  *
*********************
```

FIGURE 2C

```
*************************
*    WELCOME TO         *
*   BELL ATLANTIC       *
*   VIDEO DIAL TONE     *
*      SERVICES         *
*************************
```

FIGURE 2D

VIDEO PROVIDERS : XX

```
QQ  QQQQQQQQQQQQQQ
QQ  QQQQQQQQQQQQQQ
QQ  QQQQQQQQQQQQQQ
QQ  QQQQQQQQQQQQQQ
QQ  QQQQQQQQQQQQQQ
QQ  QQQQQQQQQQQQQQ
QQ  QQQQQQQQQQQQQQ
QQQQQQQQQQQQQQQQ
```

FIGURE 2E

```
*********************
*  PLEASE  STANDBY   *
*  FOR CONNECTION    *
*       TO           *
*  QQQQQQQQQQQQQQ    *
*********************
```

FIGURE 2F

```
*********************
*     TEMPORARY      *
*  NETWORK PROBLEMS  *
*      --------      *
*  PLEASE  TRY  AGAIN *
*        LATER       *
*********************
```

FIGURE 2G

```
*********************
*   TEMPORARY       *
* NETWORK PROBLEMS  *
*                   *
*     --------      *
* PLEASE TRY AGAIN  *
* LATER OR SELECT   *
* ANOTHER PROVIDER  *
*********************
```

FIGURE 2H

```
*********************
* THIS PROVIDER IS  *
*   CURRENTLY NOT   *
*     AVAILABLE     *
*                   *
*     --------      *
* PLEASE TRY AGAIN  *
*       LATER       *
*********************
```

FIGURE 2I

```
*************************
*  THIS PROVIDER IS      *
*   CURRENTLY   NOT      *
*      AVAILABLE         *
*       ----------       *
*  PLEASE   TRY  AGAIN   *
*  LATER  OR  SELECT     *
*  ANOTHER   PROVIDER    *
*************************
```

FIGURE 2J

```
*************************
*  THIS PROVIDER'S       *
*    PORTS ARE BUSY      *
*                        *
*       ----------       *
*   PLEASE   TRY AGAIN   *
*          LATER         *
*************************
```

FIGURE 2K

```
***********************
*  THIS PROVIDER'S    *
*   PORTS ARE BUSY    *
*     ---------       *
*  PLEASE TRY AGAIN   *
*  LATER OR SELECT    *
*  ANOTHER PROVIDER   *
***********************
```

FIGURE 2L

```
***********************
*  YOUR CONNECTION    *
*  TO THIS PROVIDER   *
*  HAS BEEN DENIED    *
*     ---------       *
*  PLEASE CONTACT     *
*    THE PROVIDER     *
***********************
```

FIGURE 2M

```
*****************
*  TECHNICAL      *
*                 *
*  DIFFICULTIES   *
*                 *
*   --------      *
*                 *
*  PLEASE CALL YOUR *
*  SET TOP PROVIDER *
*                 *
*****************
```

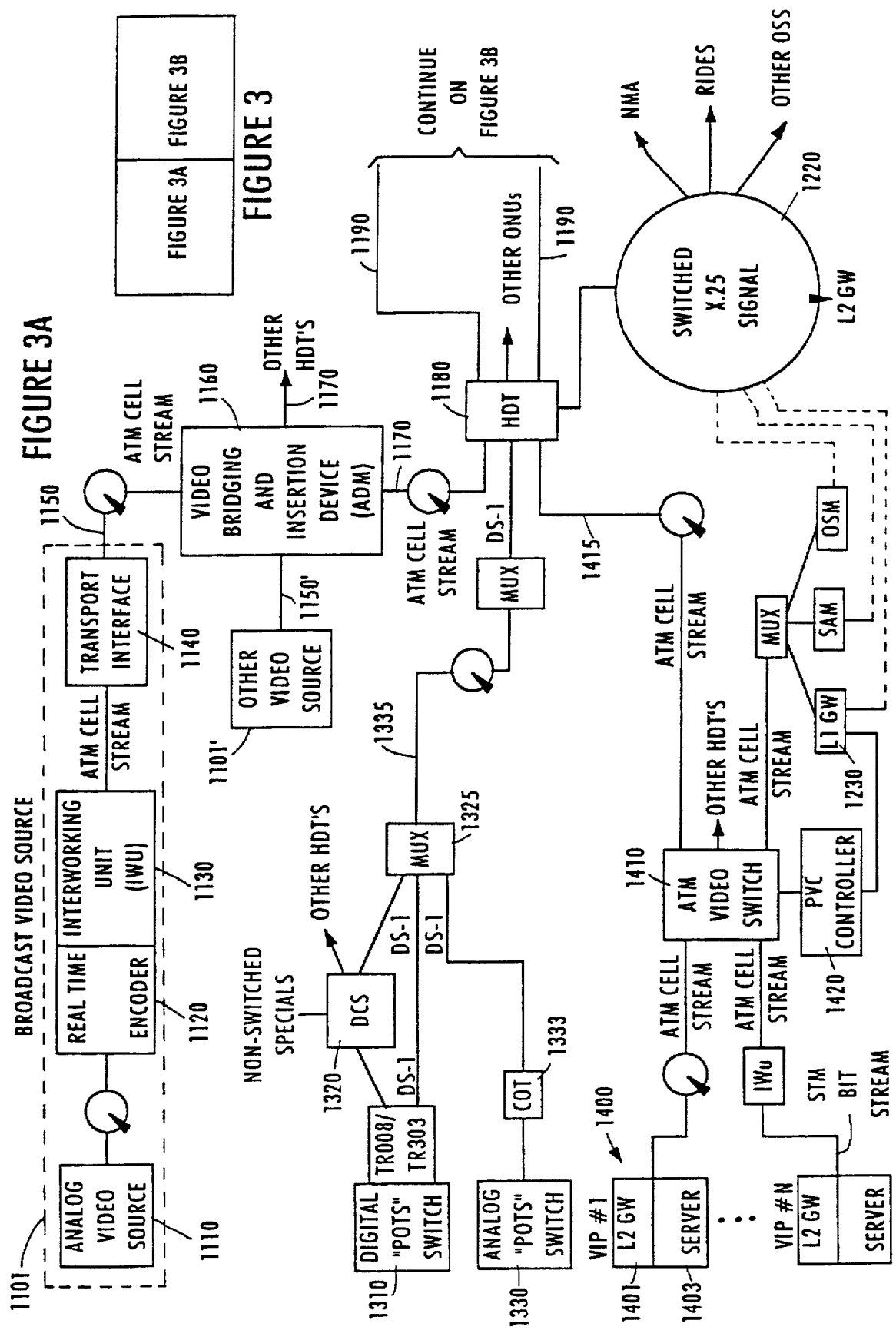

1

LEVEL 1 GATEWAY FOR VIDEO DIAL TONE NETWORKS

This application is a division of application Ser. No. 08/304,174 filed Sep. 12, 1994 abandoned.

TECHNICAL FIELD

The present invention relates to routing and access control and billing functionalities in video distribution networks capable of providing subscribers with access to multiple information service providers.

BACKGROUND ART

Distribution of full motion video data has evolved from early television broadcasting to meet viewer demand. Earliest video distribution was by point-to-point wiring between a camera and a video monitor. This was followed by scheduled television broadcasting of programming over the public air waves. In the 1960s, Community Antenna Television (CATV) was chartered to provide off-air television signals to viewers in broadcast reception fringe areas. Later, under FCC regulation, the CATV industry was required to provide local access and original programming in addition to off-air broadcast signal distribution.

In response, several sources of cable network programming were established. Because of the wide bandwidth available on cable television systems, additional channels were available for the new programming. However, programming was generally prescheduled, with the viewer left to tune to the designated channel at the appointed time to view a particular program.

To increase revenues, cable television systems have initiated distribution of premium channels viewable only by subscribers having appropriate descramblers. The subscriber tunes the descrambler to receive a premium channel, descramble the video and audio information and supply a signal capable of reception on a standard television set. Pay-per-view programs, which evolved later, include recently released movies, live concerts and popular sporting events. Subscribers wishing to view a pay-per-view program place an order with the cable operator. At the designated time, the subscriber's descrambler is activated by some control from the cable operator to permit viewing of the pay-per-view programming. However, the subscriber is still restricted to viewing the programming at the scheduled time. There is no capability of delivering programming to a subscriber on demand, that is, immediately or at a subscriber-specified time and date.

More recently, several different wideband digital distribution networks have been proposed for offering subscribers an array of video services, including true Video On Demand service. The following U.S. Patents disclose representative examples of such digital video distributions networks: U.S. Pat. Nos. 5,253,275 to Yurt et al., 5,132,992 to Yurt et al., 5,133,079 to Ballantyne et al., 5,130,792 to Tindell et al., 5,057,932 to Lang, 4,963,995 to Lang, 4,949,187 to Cohen, 5,027,400 to Baji et al., and 4,506,387 to Walter. In particular, Litteral et al. U.S. Pat. No. 5,247,347 discloses a digital video distribution network providing subscribers with access to multiple Video On Demand service providers through the public switched telephone network, as described in more detail below.

U.S. Pat. No. 5,247,347 to Litteral et al., the disclosure of which is hereby incorporated in its entirety into this disclosure by reference, discloses an enhanced public switched telephone network which also provides a video on demand service to subscribers over the public switched telephone network. A menu of video programming information is displayed at the subscriber's premises by a set-top terminal and a TV set. The subscriber may transmit ordering information via the public switched telephone network to the independent video information providers. Video programming may be accessed and transmitted to the subscriber directly from a video information provider (VIP) or through a video buffer located at a central office (CO) serving the subscriber.

Connectivity between the central office and the subscriber for transmission of video data is provided by an asymmetrical digital subscriber line (ADSL) system. ADSL interface units at the central office multiplex digital video information with voice information to be transmitted to the subscriber and support two-way transmission between the subscriber's line and the X.25 packet data network of one or more control channels. A complimentary ADSL interface unit at the subscriber's premises separates downstream video control signals and voice telephone signals from the line and multiplexes upstream control signals and voice telephone signals onto the line.

A subscriber can request transmission of video data using a telephone instrument by dialing a Voice Response Unit (VRU) of a video gateway device, through the voice telephone switch and dialing in selection information. Alternatively, the user can access the video gateway device and select a video using a remote control device, the set-top terminal and the control signaling channel through the network. The VIP's equipment identifies the requested title and determines if the title is available.

If the title is found, the corresponding data file is opened and a reserve idle communications port is identified for transmission of the video data to an input node of a digital cross-connect switch (DCS). The video data file is transmitted from the VIP's video storage device, through the DCS, to the designated ADSL interfaces for transmission to the requesting subscriber's premises. The ADSL interface on the subscriber premises demultiplexes the broadband program transmission off of the subscriber loop and applies the digital data stream to a decoder unit in the set-top terminal. The decoder unit decompresses the audio and video data, and converts the digital audio and video to corresponding analog signals. The decoder can supply baseband analog audio and video signals to a television receiver, or these analog signals can be modulated to a standard television channel frequency for use by the television receiver.

The prior art video networks have not addressed many problems which arise when the networks must be adapted to provide end users with equal access to multiple video information providers. For example, the prior art documents do not suggest an efficient procedure for accumulating usage data and billing for the switched network broadband connectivity to multiple providers. Also, the prior art systems have not addressed the need for the interactions of the end users with the video dial tone network to be readily adaptable to end user demands as well as the need to provide equal access to all of the service providers available to each end user. Thus a need clearly exists for an enhanced network control and billing system, which is both efficient and highly user friendly.

DISCLOSURE OF THE INVENTION

The principle object of the present invention is to provide a seamless, smooth approach for connecting a video information user (VIU) to the video information provider (VIP)

of their choice, in a multiple provider environment. The connection to the VIP of choice must be provided in a non-discriminatory manner that makes it easy for the user to get to that particular provider.

One more specific objective of the present invention is to provide effective techniques for billing for the communication connectivity services between multiple information service providers and end users through a broadband network.

Another objective of the present invention is to provide efficient techniques for informing subscribers of information service providers available to them through the network and responding to subscriber selections of providers to establish communication between subscribers and providers. This objective might include development of enhanced techniques for offering subscriber menus of available VIP's and or a VIP's.

A further objective of the present invention is to develop enhanced mechanisms to allow an end user to interact with a selective connectivity broadband communication network to customize services provided to that subscriber through the network.

Another objective of the invention is to provide enhanced control over establishment of communications between a subscriber and a particular information service provider, e.g. so that only authorized subscribers of that provider can communicate and/or so that subscribers can personally limit who can use their network service to access a particular provider.

Another objective is to develop network control means, providing one or more of the required enhanced functionalities discussed above, which is readily adaptable to use in a variety of different types of video distribution networks.

The present invention provides a number of the detailed network features needed to offer a truly effective video dial tone service. In particular, the present invention provides a number of enhanced network functionalities through a gateway node, referred to as the 'Level 1 Gateway'. In a network providing access to multiple service providers, the user identifies the provider of choice to the Level 1 Gateway. In response, the Level 1 Gateway controls the broadband routing functionality of the network to establish a downstream broadband communication link and a two-way communication signaling link between the provider and the user.

The Level 1 Gateway accumulates usage data for billing purposes. For example, in one embodiment a billing system processes the usage data to bill the service provider for connect time for the broadband communication links. The VIP's then bill their individual subscribers. Alternatively, the billing system can process the broadband usage information together with rate information from the service providers to produce combined bills for direct billing to the subscribers.

The Level 1 Gateway receives notification of the status of broadband communications links as they are being set up and during ongoing communications through those links. The Level 1 Gateway therefore can inform a subscriber when a requested session can not be set up with a selected service provider, i.e. because the provider's server ports are all busy or because the subscriber is not registered with the particular provider or due to some technical problem. The Level 1 Gateway also recognizes when an established link develops a fault or is interrupted and can stop accumulating usage or billing data regarding that link. The Gateway can also notify the subscriber and/or the service provider of the failure.

The Level 1 Gateway will also store various information relating to each subscriber's services and control service through the network accordingly. At least some of this stored data is accessible to the subscriber through a direct interaction with the Level 1 Gateway. For example, the user can identify certain service providers to the Level 1 Gateway and define an authorization code or identification number which must be input before the network should provide a session with equipment operated by those providers.

Many of the functions of the Level 1 Gateway relate principally to set up, monitoring and billing for point-to-point type interactive sessions. However, a number of the Gateway functions also apply to broadcast services. For example, the interaction with the Level 1 Gateway can be used to advance order upcoming broadcast pay per view events. At the time for the event to begin, the Level 1 Gateway will transmit appropriate notice to the ordering subscriber's terminal. In response, the terminal may display the notice to the subscriber or the terminal may automatically turn on and/or tune to the appropriate communication link through the broadcast network to obtain the ordered event. The interactive features of the Level 1 Gateway also permit subscribers to specify limitations they wish to place on their broadcast services, e.g. total number of hours of usage within some defined interval and/or time of day/week of permitted usage. The Level 1 Gateway will then control the broadcast network and/or the subscriber's terminal in accord with the limits defined by the subscriber.

Examples of three different networks using the inventive Gateway functionality are described in detail. As illustrated by such examples, the functions of this Gateway can be incorporated into a wide variety of advanced broadband communication networks.

In another aspect, the present invention relates to a network gateway which controls a broadband communication network. The gateway comprises a series of application modules. A service data module maintains service data files relating to information service providers offering services through the broadband communication network. This module also maintains data files regarding information users subscribing to service through the broadband communication network. A service control module interacts with users through terminals coupled to the broadband communication system. In response to selection information from the users terminals, the service control module uses the data files maintained by the service data module, to generate requests for broadband communication sessions between selected providers and selecting users terminals. A session management module is responsive to the requests for broadband communication sessions, for identifying end to end communication connectivity needed for each requested broadband communication session. The session management module generates requests for the identified end to end communication connectivity and collects usage information relating to established broadband communication sessions. A connection management module in turn is responsive to the instructions from the session management module. The connection management module identifies entry and exit points through subsections of the broadband communication network for the communication connectivity needed for each requested broadband session. This module also interacts with a control element of each subsection of the network to obtain communications connectivity through each subsection, to establish the end to end communication connectivity for each requested session. The connection management module also provides confirmation of establishment of each requested broadband communication session to the session management module.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIGS. 2A to 2M illustrate various displays generated in response to instructions from the Level 1 Gateway during broadband call processing.

FIGS. 3A and 3B are a block diagram of one example of an alternate network architecture utilizing a Level 1 Gateway, in accord with the present invention.

BEST MODE FOR CARRYING OUT THE INVENTION

Figure 1:
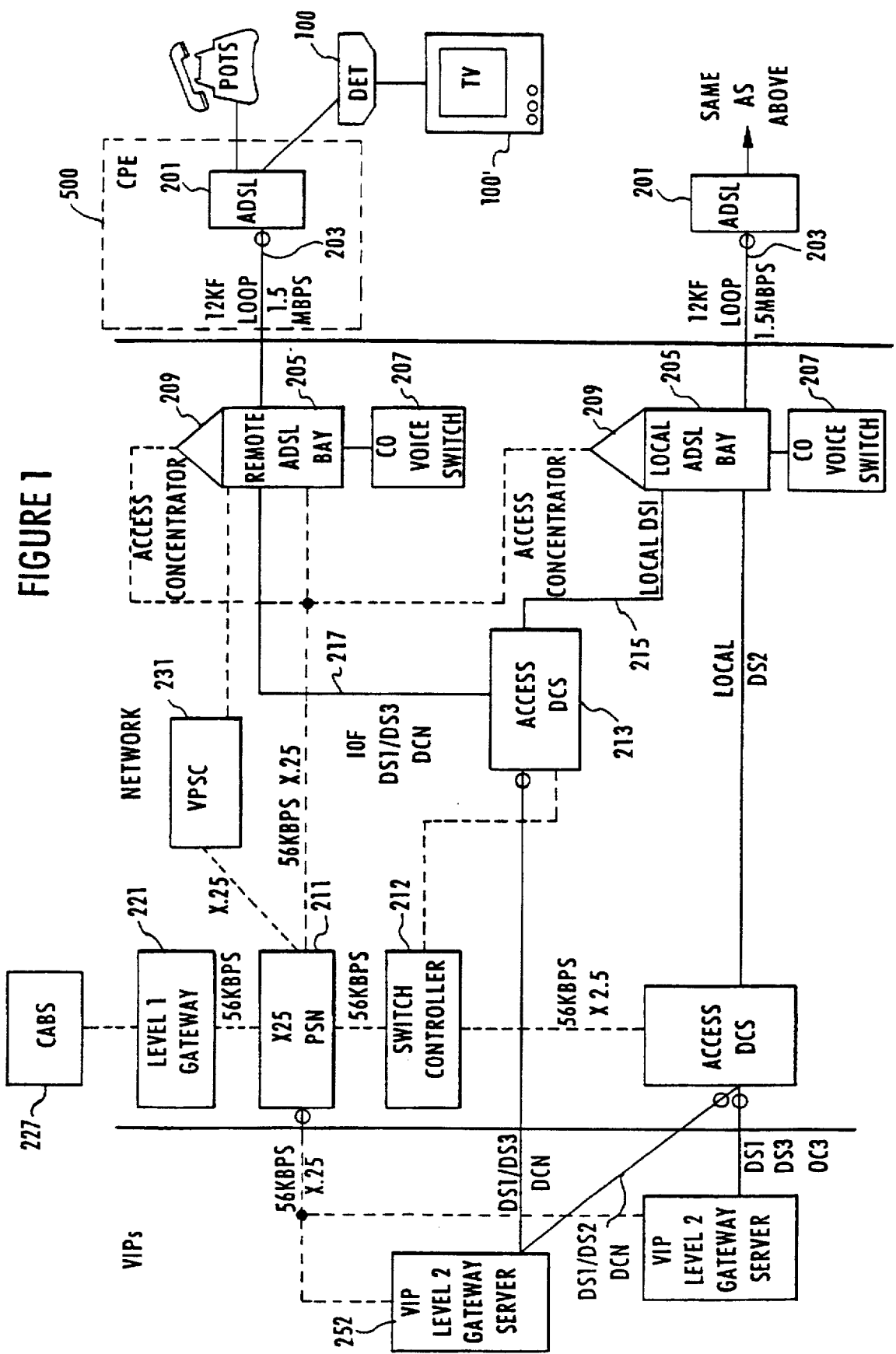
FIG. 1 is a block diagram of an example of a first Video Dial Tone network utilizing a Level 1 Gateway, in accord with the present invention.

The Level 1 Gateway of the present invention is useable in a variety of different broadband distribution networks which offer subscriber's selective communication with a plurality of broadband or video information service providers. FIG. 1 depicts one such network, referred to as a Video Dial Tone Network, which is a direct improvement over the network disclosed in the above cited Litteral et al. Patent. For ease of understanding, an overview of the Video Dial Tone network is set forth below, followed by a more detailed description of the functions of the Level 1 Gateway in that network. Two other examples of alternate networks utilizing the Level 1 Gateway will also be discussed.

Architectural Overview of Video Dial Tone Network

FIG. 1 is a block diagram an exemplary broadband network for providing interactive services, such as video on demand, home shopping or purchasing, home banking, medical information, ticket ordering, gaming, etc. In the network shown, the customer premises equipment (CPE) consists of a set top terminal identified as "DET" (digital entertainment terminal) 100 and a telephone (POTS or ISDN). The connections to the central office utilize Asymmetrical Digital Subscriber Line (ADSL) technology, typically over twisted wire pair, similar to that disclosed in the above cited Litteral et al. Patent. The ADSL connection provides a 1.5 mbits/s downstream video information channel, a two-way telephone connection and a two-way 16 kbits/s control channel. The illustrated Video Dial Tone network architecture may use some form of fiber extension in the actual subscriber loops, to provide services to subscribers located more than 1.5 kilo-feet from a central office (see e.g. U.S. patent application Ser. No. 08/233,579, in the name of Bruce Kostreski, filed Apr. 26, 1994 and entitled "Extended Range Video On Demand System"). In the network illustrated in FIG. 1, the drop to the subscriber's premises is always a wired ADSL loop.

As shown in FIG. 1, the network interface module in the DET 100 connects to an ADSL multiplexer/demultiplexer 201 similar to the in-home ADSL unit in the above discussed Litteral et al. Patent. The connection between the network interface module of the DET 100 and the in-home ADSL unit 201 may consist of an RJ48C line and connectors. Such a link comprises six wire pairs, two for the broadband data, two for upstream signaling and two for downstream signaling.

Each ADSL subscriber line 203 will connect to an ADSL bay 205 located in or associated with the subscriber's local central office. For each subscriber line 203, the ADSL bay 205 includes an ADSL multiplexer/demultiplexer similar to the central office ADSL unit in the above discussed Litteral et al. Patent. The ADSL bay 205 provides transport for voice signals on the subscriber loop to and from the associated voice switch 207. The ADSL bay 205 also connects to an access concentrator 209 for providing two-way signaling connections through an X.25 type packet switched data network 211. The ADSL bay 205 also receives broadband digital signals for downstream transport over the ADSL line 203 to each subscriber's premises from a digital cross connect switch 213, labelled "Access DCS" in the drawing. One ADSL line 203 to the home carries one channel of video programming and provides a single output channel. The output channel can provide a video signal to a VCR (not shown) or to the TV set 100'. The various Access DCS switches throughout the network are controlled by switch controller 212.

If the ADSL bay 205 is local, i.e. located in the same telephone company central office as the cross connect switch DCS 213, the ADSL bay 205 connects to the Access DCS 213 via an appropriate number of local DS1 connections 215. In service areas where an ADSL bay does not carry enough traffic to warrant an associated Access DCS, the ADSL bay will be located in a remote central office facility. Such a remote ADSL bay connects to the Access DCS 213 via a SONET type optical fiber link 217 providing an appropriate number of multiplexed channels to service the number of subscribers connected to the particular ADSL bay.

Video Information service Providers (VIP's) may access the downstream broadband portion of the system at a hub location (not shown) within a given LATA. The hub will not perform any switching. High capacity optical fiber links are aggregated at the hub to provide each VIP with a number of connections (e.g. one or more OC-3 links) from their respective video server to each Access DCS within the LATA.

The Access DCS 213 provides both point-to-point connections and point-to-multipoint connections. Individualized interactive services, such as Video On Demand, home shopping/purchasing and banking, use point-to-point connections wherein the Access DCS connects one broadband input port from a VIP's server to one output port going to the subscriber's ADSL line. Narrowcast and broadcast services utilize point-to-multi-point connections of one input port to a plurality of output ports.

The illustrated architecture of the Video Dial Tone network utilizes two levels of gateways, both of which will communicate with subscribers' DET's via the X.25 data network 211 and the signaling channel on the ADSL subscriber loops 203.

The Level 1 Gateway 221 performs a variety of network connectivity related functions, including communications port management of transmissions of information between subscribers and servers, processing of billing information and session management. Normally, each subscriber accesses the Level 1 Gateway (e.g. to select and access a particular VIP's server) by operation of a remote control device which causes the subscriber's DET 100 to transmit data signals to the Level 1 Gateway via the 16 kbits/s control channel and the X.25 packet switched data network 211. The Level 1 Gateway transmits one or more selection menus to the subscriber's DET 100 as screens of text data carried by the same path back through the network.

In the present implementation, text or graphics information from the Level 1 Gateway is displayed as a page of data. Alternatively, the text or graphics data could be overlaid on a video display received through the broadband network, e.g. over one of the broadcast channels carried through the more advanced networks discussed below.

In a typical scenario, the user would turn on the DET terminal 100, and in response to data signals from the Level 1 Gateway 221, the terminal would display an initial selection menu. The subscriber would input a selection, and in response to an appropriate data signal from the DET 100, the Level 1 Gateway 221 would instruct the various network components to set up a virtual circuit to the level 2 gateway of a selected VIP for signaling purposes and a direct downstream path from the VIP's server through the digital cross-connect switch 213 for video transmission.

The Level 1 Gateway 221 accumulates usage statistics relating to the broadband communication links through the network and supplies those statistics to a billing system, e.g. to a carrier access billing system (CABS) 227 as shown in FIG. 1. The Level 1 Gateway 221 also exchanges various network operational status information with the switch controller 212 and with a video provider service center (VPSC) 231.

These and additional functions of the Level 1 Gateway are discussed in more detail below.

A level 2 gateway provides a number of services for the Information Providers. These services include transmission of menus of available information to subscribers, searches of available information, targeted advertisement insertion, previews, trailers, etc. The level 2 gateway will download video or audio menus to each subscriber's DET for display, thereby allowing each subscriber to select desired information. Once a subscriber makes a selection, the level 2 gateway will signal the appropriate server to schedule transmission of the selected information through the established downstream video transmission path. The Level 1 Gateway accumulates connectivity charge information for purposes of billing each called VIP. The level 2 gateway records transactions, e.g. movies viewed, by each subscriber for billing purposes. The level 2 gateway also interacts with the DET 100 and controls the associated servers to download executable program code for storage in the DET system memory.

The switch controller 212 monitors operations of the digital cross connect switches 213 and provides appropriate information to the Level 1 Gateway. For example, if the switch controller 212 indicates that a broadband communication link through one of the switches has failed for some reason, the Level 1 Gateway will terminate its accumulation of usage data for billing for the particular broadband session. The video provider service center (VPSC) 231 performs a related monitoring function with regard to the ADSL loops.

The ADSL bays 205 monitor communications over the subscriber lines 203 by periodically enquiring as to the status of each on-premise ADSL unit 201. The ADSL bays 205 in turn inform the video provider service center (VPSC) 231 of any detected failures via data connections to that center (only one such data connection is illustrated in FIG. 1). In the presently preferred embodiment of the network of FIG. 1, the service center (VPSC) 231 is manned operations support personnel. In response to a failure alarm indicating one of the ADSL lines is down, the center 231 provides a display for review by one of the technicians. A VIP may also call in and indicate that the VIP's system 252 has detected some form of failure. Based on the displayed information and/or the information from the VIP, the technician decides whether in fact a failure has occurred. If so, the technician initiates an X.25 data call and transmission of a message from the video provider service center (VPSC) 231 to the Level 1 Gateway 221 identifying the failed link and instructing the Gateway 221 to tear down the particular broadband link. The Level 1 Gateway 221 terminates its accumulation of usage time data for that link and instructs the switch controller 212 to tear down the link.

Upon detection of a fault and reporting thereof to the video provider service center (VPSC) 231, personnel at the center can initiate action to correct the fault. For example, if the switch controller 212 reports a fault in a particular switch 213, the personnel at the service center (VPSC) 231 can call a technician at the central office housing that switch and have that technician test the switch and correct any faults actually discovered. Similarly, if an ADSL bay 205 reports some fault on the twisted wire pair 203 or loss of communications with the on-premises ADSL unit 201, the personnel at the service center (VPSC) 231 can dispatch a repair technician to locate and correct the fault on the line or in the on-premises unit.

As discussed in more detail with regard to later network embodiments, it is preferred for more advanced versions of the network that the function of the video provider service center (VPSC) 231 be fully automated to instruct the Level 1 Gateway 221 to stop billing data accumulation and tear down faulty broadband links without human intervention.

The Video Dial Tone network of FIG. 1 provides video on demand and other broadband interactive multimedia services offered by a plurality of service providers. For example, using the upstream data channel, the subscriber can send a request for a particular movie from his VIP of choice, and the VIP's server will retrieve and transmit that movie as an MPEG digital data stream on the 1.5 Mbits/s downstream channel to the digital audio/video processor in the subscriber's DET 100.

Although other digital compression encoding schemes may be used, such as DIGICIPHER™, the preferred embodiments of the present invention utilize MPEG encoding and decoding. MPEG (moving picture experts group) is a broad generic standard for video program compression, and MPEG 2 is a second generation compression standard for packetized transport of one or more compressed video program signals in a single stream. A number of specific compression algorithms will satisfy MPEG requirements. Typically, MPEG permits encoding of audio/video program materials into digitized, compressed format at rates in the range of 1.5 to 6 Mbits/sec.

In the illustrated network, the DET 100 includes a CPU, comprising a 386 or 486 microprocessor and associated memory (RAM, ROM and EPROM) and an audio/video decoder, controlled by the CPU. The audio/video decoder decompresses the digitized broadband information. The preferred embodiment of the audio/video decoder comprises an MPEG video decoder, an MPEG audio decoder, and an MPEG demultiplexer for selectively routing MPEG encoded video and audio packets carried on the digital broadband channel to the MPEG video decoder and the MPEG audio decoder, respectively. The DET also includes a graphics display generator for generating displays of received text data, such as the initial turn-on selection menu, discussed in more detail below. The DET also includes digital to analog converters and appropriate drivers to produce output signals compatible with a conventional television set from the decoded audio/video information and the graphics display. Each DET also includes means to receive selection signals from a user and transmit appropriate data signals over a narrowband channel through the particular video network.

The digital entertainment terminal (DET) 100 is a programmable device to which different individual video information providers (VIP's) can download different applications software. At least one VIP, typically a vendor of the DET, also can download portions of the operating system. The DET will permanently store only an operating system and a loader program, to control initial communications with a Level 1 Gateway or to facilitate initialization into a simplified CATV type mode of operation.

The structure and operation of the DET 100, outlined above, are described in more detail in commonly assigned application Ser. No. 08/250,791, filed May 27, 1994, entitled "Dynamically Programmable Digital Entertainment Terminal" (attorney docket no. 680-083), the disclosure of which is entirely incorporated herein by reference.

Level 1 Gateway Functionality

Physically, the Level 1 Gateway is a mini-computer, and in the Video Dial Tone network of FIG. 1, that computer would have interfaces for X.25 packet data communications. In one implementation, the Level 1 Gateway is a UNIX based machine, such as a Tandem Integrity type computer. Essentially, the Level 1 Gateway comprises a processor CPU, with associated RAM and ROM, as well as mass data storage and retrieval means, e.g. various disc drives. There is one Level 1 Gateway per LATA, as shown in FIG. 1. However, for service areas encompassing a number of LATA's, the video dial tone network would include a plurality of Level 1 Gateways.

Figure 2:
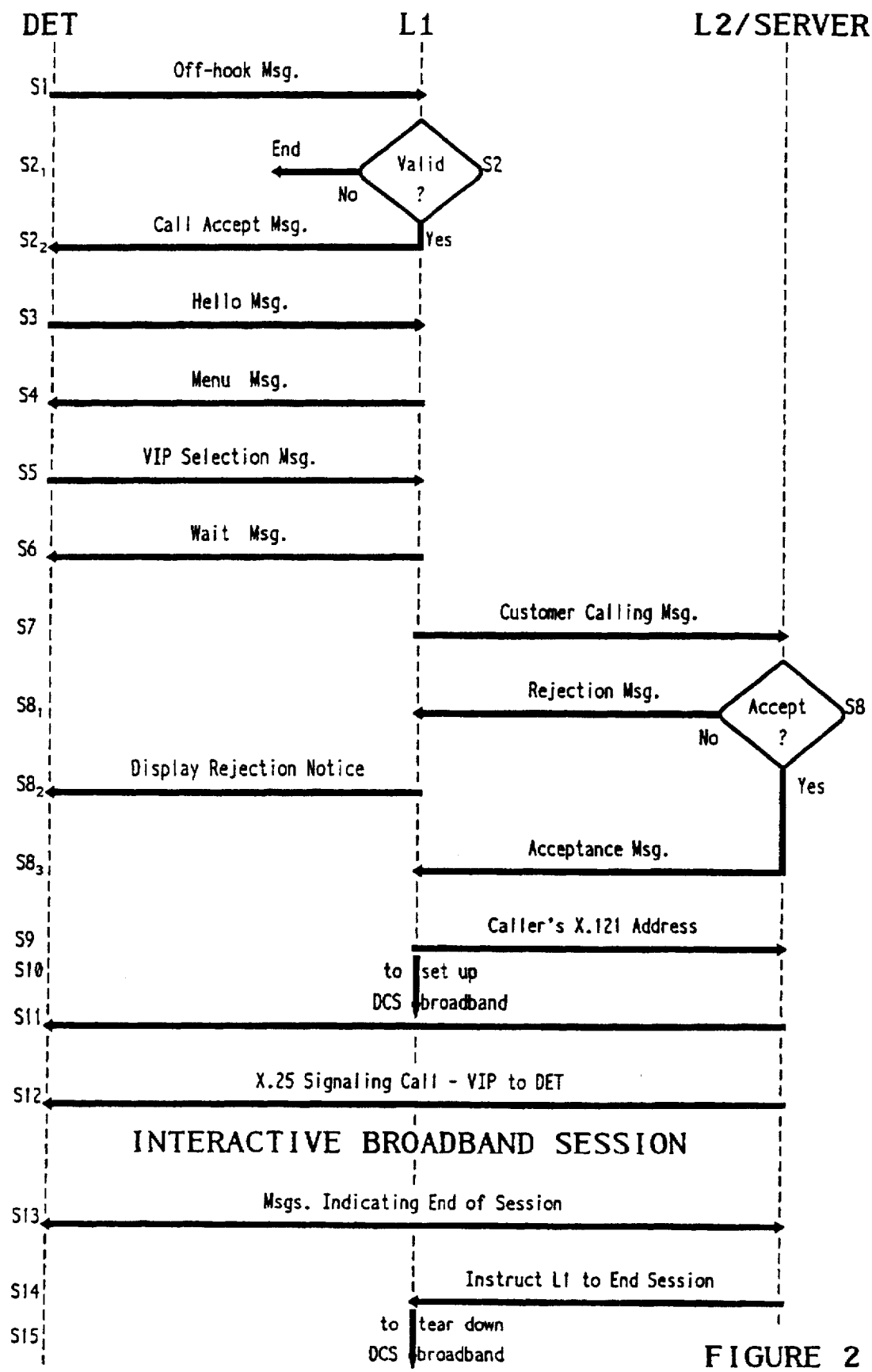
FIG. 2 illustrates, in simplified form, the flow of messages between various components of the network of FIG. 1 during establishment of an interactive broadband communication session.

FIG. 2 provides a somewhat simplified illustration of the process flow, with particular emphasis on the exchange of signals involved in setting up, carrying on and tearing down an interactive broadband session between a DET and a selected VIP's equipment.

To access the system, the customer turns on the digital entertainment terminal (DET) 100. As shown at step S1 in FIG. 2, the DET transmits an "offhook" message upstream to the Level 1 Gateway servicing that DET. Specifically, the DET type terminal transmits an X.25 message through the upstream signal path to the access concentrator 209. This is a generic off-hook message, and the message from the terminal 100 carries no addressing. The access concentrator 209 identifies the off-hook DET 100 by identifying the physical ADSL port on the access concentrator through which it received the message and assigns a signalling address to that terminal. The access concentrator 209 populates the correct X.121 address for the sender into the call request message and populates the correct X.121 address for the Level 1 Gateway 221 into the message. The access concentrator 209 sends the addressed message through the X.25 packet switched network 211 to the Level 1 Gateway 221. Thus, the call is terminated in the Level 1 Gateway 221 as an X.25 data call, and a two-way virtual circuit is dedicated to data communications between the Gateway 221 and the DET 100 for the duration of the call set-up processing. The X.121 addresses are used for call set. During call set-up an available X.25 virtual circuit is defined for data flow in both directions, and subsequent packet transmissions will utilize appropriate packet headers to follow that virtual circuit node-to-node through the X.25 packet network.

The Level 1 Gateway 221 includes a file for each subscriber containing the subscriber's billing telephone number, the subscriber's X.121 address for signaling purposes, and the port identification of the broadband connection of the subscriber's line to the digital cross-connect switch (DCS) 213 serving the particular subscriber. When the Level 1 Gateway 221 receives the addressed message from the access concentrator 209, that Gateway uses the X.121 address of the caller to check its internal database to determine if the caller is a valid video dial tone customer (S2). If the caller is not a valid customer, the system tears downs the session ($S2_1$). Although not shown as a separate step in FIG. 2, the Level 1 Gateway will typically transmit an instruction to the DET 100 to display some service denial message, such as that shown in FIG. 2A, as part of the operations to terminal communications with the particular DET. If the caller is a valid customer, the Level 1 Gateway 221 transmits an X.25 call accept message back to the DET 100 ($S2_2$) and waits for the first application level message.

Once the call is accepted and an X.25 signalling link is provided, the set-top terminal DET 100 sends an initiation message that says "hello" (S3). This "hello" message includes basic information such as a customer premises equipment (CPE) identifier and a CPE type designation of the particular DET. This information is primarily for the level 2 gateway. The Level 1 Gateway 221 normally transmits back menu information, as ASCII data in X.25 message form (S4). The menu gives the customer the option to ask for a particular video information provider (VIP), such as the VIP operating the system 252. In the illustrated example, each VIP provides a level 2 gateway and some form of broadband information server 252 connected to the network.

Each level 2 gateway is assigned a 4-digit code. Some DET's will have the option of preassigning a 4-digit VIP code, so that such a terminal always automatically transmits the preassigned 4 digit VIP code immediately with the initial "hello" message. Inclusion of the 4 digit VIP code in the initial message indicates the subscriber's VIP preference. As a result, the customer could always go to the same preferred VIP, and the customer need never see a VIP selection menu. The Level 1 Gateway 221 checks the validity of the VIP code. Assuming the VIP code is valid, the Gateway 221 would see that this call is from a valid customer and initiate signaling communication with the particular VIP's level 2 gateway immediately.

If the Level 1 Gateway 221 detects that a received VIP preference code was not a valid VIP identifier code, the Gateway 221 transmits a message to the DET 100 through the signaling channel instructing the DET to display the notice shown in FIG. 2B. As shown in that drawing, the displayed notice informs the customer that the video provider preference was not recognized. The notice also informs the subscriber that a VIP selection menu will be forth coming. The Level 1 Gateway will wait for some finite period to permit the subscriber to review the displayed notice and then proceed with call processing as if a standard "hello" message had been received (without any VIP preference code), as discussed in more detail below.

The DET and/or remote control associated therewith will have appropriate keys to write a VIP preference into the memory of the DET 100. The DET 100 and/or remote control will also have a key or keys for input of an instruction to override the preprogrammed VIP preference. If the subscriber overrides the preference, the DET 100 will issue a normal "hello" message without the VIP identifier code, and processing will advance as if a standard "hello" message had been received (without any VIP preference code), as discussed below.

If there is no VIP preference code in the X.25 "hello" message (see S3) or the preference code was invalid, the Level 1 Gateway 221 sends a banner followed a few seconds thereafter by a menu, through the downstream signaling channel (34). The banner display (FIG. 2C) depicts an initial greeting, such as "Welcome to Bell Atlantic Video Dial Tone Services". The menu is a screen of text and/or graphic images listing VIP's available to this customer. FIG. 2D shows the format of the menu display. As shown, the menu displays the number of available providers (VIP's), lists each provider by two-digit code, and gives the name of each provider. Although shown as two separate displays, the banner and first menu page can be combined into one display page requiring only a single transmission by the Level 1 Gateway. Alternatively the banner may be eliminated. One line of the menu page can indicate that the menu includes additional pages and what keys to actuate to request the next page from the Level 1 Gateway. If a customer selects an additional VIP menu page, the DET 100 transmits an appropriate request message to the Level 1 Gateway 221, and that Gateway transmits back another page of data for display.

The remote control or keypad input on the set-top terminal has arrow keys which allow the user to select from the VIP's listed on the visually displayed menu. The subscriber reviews the menu on their television set, and operates the arrow keys to move a cursor across the menu to an appropriate point on the screen, after which the user presses an <ENTER> key on the keypad or remote control. Alternatively, the user can enter the two digits shown in the VIP's listing beside the name and then press <ENTER>. In response to either type of VIP selection input, the DET 100 transmits an appropriate data signal upstream through the network to the Level 1 Gateway 221 (S4). When the Level 1 Gateway sends the selection menu to the set-top terminal, if no response is received from the DET 100 within a predetermined period, the Level 1 Gateway tears down the X.25 signaling link to that terminal. As discussed in more detail below, the Level 1 Gateway 221 will normally receive the selection input message from the DET 100 within the predetermined period and will translate that message into the 4 digit code for the selected VIP's level 2 gateway.

The VIP menu, formatted as pages of data in the manner shown in FIG. 2D, is created as a function of which VIP's have access to each access digital cross-connect switch (DCS). As shown in FIG. 1, the video dial tone network uses a number of DCS's serving different geographical areas and different subscribers. The DCS's will typically be in different central offices. Not all VIP's connect to and provide services through all of the DCS's. When a subscriber accesses the Level 1 Gateway 221, that Gateway knows which DCS services that subscriber and which VIP's have server ports on that DCS. The Level 1 Gateway 221 therefore limits the VIP's listed on the menu sent to the subscriber's DET 100 to those VIP's providing services through the particular DCS. In the currently preferred embodiment, the information on the menu that pertains to the various available providers is kept alphabetically. Alternatively, the Level 1 Gateway 221 may randomly rearrange the order of the VIP listings in the menu on some periodic basis.

The present invention also permits the customer to modify the menu to their own personal tastes. Thus, if there are ten providers available through a particular DCS, and the customer has opted to see only three on a regular basis, the Level 1 Gateway recognizes the customer's DET and transmits a customized menu listing only those three to the customer's DET terminal for display.

As outlined above, the user typically reviews the menu displayed on the TV screen and selects one of the available VIP's. In response, the user's DET 100 transmits a signal identifying the number of the selection from the menu upstream to the Level 1 Gateway 221 (S5). The Level 1 Gateway always knows what menu it sent to the particular DET. The Level 1 Gateway 221 uses the precise menu information and a table of VIP identifier codes to translate the selection input signal from the DET 100 into an actual 4-digit VIP identification address for the level 2 gateway of the particular VIP that the person selected. The Level 1 Gateway 221 sends an X.25 message to the DET 100 saying please wait while we connect to the VIP's system 252 (S6). In response, the DET produces a standby display, such as the display shown in FIG. 2E. The display preferably will identify the VIP that the customer is awaiting connection to. The row of 'Q's in FIG. 2E indicate the display space in which the VIP's name is inserted The Level 1 Gateway 221 next goes over a locked up "permanent" virtual circuit through the X.25 network, to communicate with the level 2 gateway of the VIP's system 252. Specifically, the Level 1 Gateway 221 contacts the level 2 gateway and indicates, through a standard message, that it has a customer calling (S7). The Level 1 Gateway 221 identifies the customer to the level 2 gateway by sending the standard billing telephone number for the calling customer to the level 2 gateway. The CPE identification information and the CPE-type information for the DET 100 that was sent in the initial origination message is also sent to the level 2 gateway (VIP) at this time. The VIP's level 2 gateway may accept or reject the call (S8) after receiving the initial request indicating a customer is available.

When the Level 1 Gateway 221 initially asks the level 2 gateway if a calling subscriber is a valid customer, the Level 1 Gateway expects a response accepting or rejecting the call within a set time, and if the response is not received in that time, the Level 1 Gateway sets off an appropriate alarm. The Level 1 Gateway 221 would inform the DET 100 of the inability to reach the selected VIP and instruct the DET to provide an appropriate display through the TV 100' to the user. The display might inform the user that there is some form of network problem and either instruct the user to try again later (FIG. 2F) or to select another provider (FIG. 2G), depending on whether other providers are available as indicated on the VIP selection menu presented to this subscriber. Alternatively, the Gateway 221 could use one of the provider—unavailable message of FIGS. 2H and 2I.

The level 2 gateway may reject the call for a number of reasons. For example, that gateway may look up the caller's telephone number in a list of the VIP's subscribers' telephone numbers to determine if the caller in fact subscribes to the VIP's services. The level 2 gateway may also check on the calling subscriber's current billing/payment status. Non-subscribers and/or subscribers who are delinquent in paying their bills to the VIP would be rejected. The level 2 gateway might also reject a call if all its existing server output ports on the DCS 213 serving the particular subscriber are currently in use. If the level 2 gateway decides to reject a call, that gateway sends a message back to the Level 1 Gateway 221 indicating a rejection of the call ($S8_1$). The rejection message indicates the reason for the rejection. The Level 1 Gateway 221 transmits a message to the DET 100 instructing that terminal to display an appropriate one of the notices shown in FIGS. 2H through 2L as a call rejection notice on the associated TV 100' ($S8_2$).

The specific rejection notice displayed to the calling subscriber depends on the circumstances of the particular call rejection. If the provider can not service the broadband call at this time because of some server failure, the message would indicate to the user that the provider is not available. If no other providers are available to the particular caller, the message would suggest that the caller try again later, as in FIG. 2H. Alternatively, if the caller has access to other providers the message would suggest that the caller select another provider, as shown in FIG. 2I. If all of the selected the provider's server ports are busy, the Level 1 Gateway would instruct the DET 100 to display one of the busy notices shown in FIGS. 2J and 2K, depending on whether or not other providers are available to the particular caller. If the VIP arbitrarily denies access, e.g. because the caller is not a recognized subscriber or has not paid her bill, then the Level 1 Gateway would instruct the DET 100 to display a call denial message, such as shown in FIG. 2L.

Alternatively, the level 2 gateway accepts the call, provides a server output port and gives an identification for that port to the Level 1 Gateway 221 (S8$_3$). In response, the Level 1 Gateway 221 transmits the X.121 address of the calling customer to the level 2 gateway (S9). The Level 1 Gateway 221 looks in its internal record to find the broadband port number for the requesting customer and sends a message to the switch controller 212 instructing one of the DCS's 213 to connect the server port the VIP provided to the broadband port for the subscriber, to thereby set up the broadband communication link (S12). The level 2 gateway uses the customer's X.121 and its own X.121 address to initiate a new X.25 signaling communication type call to the subscriber's DET 100 (S11).

If the broadband connection is successfully set up, the switch controller 212 transmits back an indication that the broadband connection has been established. Then the Level 1 Gateway 221 tears down its own X.25 signaling connection with the subscriber's DET 100. At that time, the Level 1 Gateway 221 informs the level 2 gateway that it has set up a good broadband link, and the Level 1 Gateway 221 initiates a billing record for the call. An interactive broadband session ensues via the broadband and signaling links.

Alternatively, if the switch controller 212 could not establish the broadband communication link, the controller 212 informs the Level 1 Gateway 221 of that fact and the specific reason it could not establish the broadband link. The Level 1 Gateway passes that information on to the level 2 gateway. The codes identifying the basis for the failure to complete the broadband call provide the level 2 gateway information as to whether the failure is a one time condition or is continuous, whether or not the failure is network-wide, etc. This information is useful to the operator of the level 2 gateway, for example, to determine whether to continue to send requests for broadband channels through the Level 1 Gateway or to suspend operations until receiving notice that a network fault has been cleared. The level 1 Gateway 221 also provides an appropriate message through the signaling channel for display by the DET 100 informing the customer. The displayed message might offer the customer the option to select another VIP if the fault relates only to accessing the selected VIP (similar to FIG. 2I), and if the customer does so, the call processing begins again with transmission and display of the VIP selection menu.

When a broadband session ends, e.g. as indicated by an exchange of appropriate messages between the DET and the level 2 gateway (S13), the level 2 gateway instructs the Level 1 Gateway 221 to tear down the broadband session connection (S14). The instruction includes the customer's billing telephone number and the server port identification for the VIP port used for the broadband communication. In response, the Level 1 Gateway 221 stops the billing timing for that broadband session and transmits an instruction through the switch controller 212 to the DCS 213 to tear down the broadband connection between the server port and the customer's broadband port (S15).

The port identifications are always ten-digit numbers. Of the digits, the second, third and forth digit positions identify the digital cross-connect switch (DCS) in question. At any point, when a VIP's level 2 gateway sends a ten-digit server port identification number to the Level 1 Gateway, for setting up or tearing down a link to a particular subscriber port, the Level 1 Gateway compares the second, third and fourth digits to the corresponding digits of the subscriber's port identification to determine if the server port is in fact on the same digital cross-connect switch as the subscriber's port. If the digits do not match as they should, the Level 1 Gateway informs the level 2 gateway of the error and requests a new server port identification.

The Level 1 Gateway 221 creates a log record that contains specific information including the time that the Level 1 Gateway received or sent each message. Information of a failure is furnished by the switch controller 212. The switch controller will indicate between which ports the failure occurs. The Level 1 Gateway then notifies level 2 gateway and possibly the set-top terminal that a network failure has occurred and the communication link is lost.

The Level 1 Gateway collects usage statistics for billing purposes. The VIP's may choose to collect audience statistics through the level 2 gateways. In the preferred implementation of the video dial tone network of FIG. 1, the subscriber may be charged a flat monthly charge, e.g. on her telephone bill, for video dial tone service. The usage sensitive charges for the broadband connections through the network, however, go to the VIP's. However, an alternate implementation of the present invention combines network usage charges with VIP's service charges into a single bill to be sent directly to each subscriber.

For billing purposes, the Level 1 Gateway creates a billing record for each call which resulted in an actual broadband connection through one of the digital cross-connect switches (DCS's). The billing record identifies the level 2 gateway, by its 4-digit code. The billing record includes an identification of the customer by billing telephone number, the type of call (e.g. ADSL or fiber), an identifier of the digital cross connect switch (DCS) which provided the broadband connection, an identifier of the particular Level 1 Gateway that serviced the call, the connect date, the time that the broadband connection was first established, and the elapsed time until teardown of the broadband link. The Level 1 Gateway supplies all of this information directly through a transmission link to the telephone company's carrier access billing system (CABS) 227 for processing into appropriate invoices for billing the VIP, in a manner substantially similar to billing of an Interexchange Carrier. The usage data can be downloaded periodically to the CABS 227, or the Level 1 Gateway may initiate downloading in response to a manual request from the system administrator. Each VIP establishes its own rates and procedures for actually billing the end users. The Level 1 Gateway and CABS systems may also accumulate data and bill the VIP's for the X.25 signaling links, but in the current implementation there would not be any separate charges for the various X.25 signaling communications.

In the illustrated implementation, the video dial tone network essentially bills the VIP for the broadband connection time, and each VIP in turn bills its subscribers. As an alternative, the Level 1 Gateway 212 can supply the broadband usage information to a customer record information system or 'CRIS' (not shown). CRIS would store information as to each VIP's service charges and would process that information together with the usage data from the Level 1 Gateway to generate a combined bill for the end user/subscriber. The subscriber would pay the billed amount to the network operations company, typically the local telephone company, and the network operations company would divide the received revenues between itself and the VIP(s).

To change connections from one VIP to another, the user initiates a sign-off procedure with the first VIP. The first VIP's level 2 gateway instructs the Level 1 Gateway 221 to tear down the broadband link, as discussed above, and the DET 100 initiates a new VIP selection procedure with the Level 1 Gateway in a manner similar to the initial turn-on communication discussed above.

If the user simply turns off the set-top terminal DET 100 in the middle of a video session, the DET will send some form of "terminate" message through the signaling link to the level 2 gateway. The level 2 gateway would instruct the Level 1 Gateway 221 to tear down the broadband connection and stop billing in the above discussed manner. When the subscriber turns the DET 100 back on, that terminal begins a new communication with the Level 1 Gateway 221 in the normal manner. If for some reason the broadband link with the first VIP has not yet been torn down, e.g. because of some failure or time delay incurred in that VIP's signaling the Level 1 Gateway 221 to take down the first connection, the Level 1 Gateway will discover this fact at the time it instructs the switch controller 212 to set up the second connection to the newly selected VIP. At that time, the Level 1 Gateway 221 will instruct the switch controller 212 to tear down the first connection and set up the second connection.

The Level 1 Gateway also offers a personal identification number (PIN) control functionality. This gives the end user the ability to assign a PIN number to one or more of the VIP's shown on the VIP selection menu. For example, certain VIP's might show materials which a parent might deem unsuitable for young children to view. Such a parent would assign a PIN to those VIP's. When someone selected such a VIP from the menu, the Level 1 Gateway 221 would instruct the DET 100 to output a prompting type display and/or audio message requesting input of the PIN. The parent would know the PIN and be able input the correct PIN, using the DET remote control, to access the VIP. However, a child not knowing the PIN would not be able to give the correct response to the prompt, and the Level 1 Gateway 221 would deny access.

In addition to the VIP selection options, the initial menu from the Level 1 Gateway will offer callers the ability to interact with that Gateway to control their video dial tone service. With this feature, the subscriber would initiate communications with the Level 1 Gateway in precisely the same manner as for a call to a video information provider (VIP), as discussed above with regard to FIG. 2. In the menu format of FIG. 2D, one or more of the VIP listing lines would identify Level 1 Gateway interactions, e.g. for "Personal Options". Selection of one such choice from the menu initiates an interactive session between the subscriber and the Level 1 Gateway. In the network of FIG. 1, the communications for this session will be entirely through the signaling channel. The DET 100 transmits upstream signals through the signaling link and the X.25 data call to the Level 1 Gateway 221, and the Gateway 221 transmits text or graphics displays and instructions to the DET 100 back downstream through that signaling path. In a further enhanced implementation, the Level 1 Gateway would have broadband communication capabilities.

A "Personal Options" session with the Level 1 Gateway would step the subscriber through a series of menus and inputs to select an option to modify (e.g. PIN number or customize menu) and collect the information from the subscriber needed to execute that option. For example, if the subscriber selected the PIN number option, the Level 1 Gateway would ask for a four digit PIN number input from the subscriber and then ask which VIP's on the menu subscriber wanted that PIN applied to. The currently preferred implementation offers only a single PIN for all VIP's a subscriber chooses to restrict access to. Alternatively, the Level 1 Gateway could offer to apply different PIN numbers to different VIP's. A similar procedure permits a subscriber to set up a short list of VIP's that subscriber prefers.

In the implementation of FIG. 1, the "Personal Options" through the Level 1 Gateway 221 are limited to PIN number and menu customization. In more advanced networks offering additional services, such as broadcast video and pay per view, this Level 1 Gateway feature would allow the subscriber to set up and modify a wider variety of service options. For example, the Level 1 Gateway might offer a subscriber an option to specify or change a level of broadcast service. As another personal option, the Level 1 Gateway might offer a subscriber an "Hours of Service" control. If the subscriber selects this option, the Gateway would ask for input of a number for use as a threshold value. For each week (or other specified time interval), the Level 1 Gateway would monitor the number of hours of service provided to that subscriber's DET(s) and would terminate service to that subscriber's DET(s) if usage exceeded the threshold number input by the subscriber. This service time limitation might have an attendant PIN number based override to permit some member of the household (typically a parent) to override the hours of service limitation. The Level 1 Gateway could similarly offer subscribers the option to specify time of day/week limitations and then would deny service at other times unless a valid PIN number was received.

As noted during the above discussion, the Level 1 Gateway may receive an indication from the switch controller 212 that it can not establish a desired broadband connection. The controller 212 monitors operations of the individual DCS switches 213 at all times and will also inform the Level 1 Gateway upon detection of a fault or interruption in an established broadband connection. The level 1 Gateway 221 transmits notice of an inability to establish a desired broadband session to the requesting DET, using notices such as shown in FIGS. 2F and 2G depending on whether or not other VIP's are available to the particular subscriber at the time of the call. If the Level 1 Gateway 221 receives notice of a fault in an already established session, the Gateway 221 stops accumulating billing data for that session and transmits an X.25 message regarding the failure to the VIP's level 2 gateway. The level 2 gateway may provide an appropriate notice to the subscriber through the signaling link, if that portion of the session is still operative. Alternatively, the Level 1 Gateway may initiate a new X.25 call to the subscriber's DET 100 to provide an appropriate display notice.

The VPSC 231 monitors the operations of ADSL communications capabilities on each subscriber's line. If the VPSC 231 detects a fault in a line currently engaged in a broadband communication session, and the technician at the center 231 determines that the fault is real, then the VPSC 231 makes an X.25 call to the Level 1 Gateway 221 and sends an error message identifying the line to the Level 1

Gateway 221. The Gateway 221 stops accumulating billing data for that session and transmits a message to the switch controller 212 to tear down the session. Once the switch controller 212 provides a positive acknowledgement to the Level 1 Gateway 221 that the session has been torn down, the Gateway 221 provides a confirmation message to the VPSC 231. The Level 1 Gateway also transmits an X.25 message regarding the failure to the VIP's level 2 gateway. The level 2 gateway may provide an appropriate notice to the subscriber through the signaling link, if that portion of the session is still operative. However, in the preferred embodiment, the level 2 gateway terminates its X.25 call to the DET 100, and the Level 1 Gateway initiates a new X.25 call to the subscriber's DET 100 to provide an appropriate display notice regarding the line failure. If the problem was line related, a network problem type display notice, such as shown in FIG. 2F, could be used. If the fault report suggested some defect in the DET or broadband communications from the ADSL unit 201 to the DET 100, the Level 1 Gateway 221 would specify a display notice relating to the DET itself, such as that shown in FIG. 2M.

The Level 1 Gateway 221 can also initiate an audit of the status of a subscriber's line. The Level 1 Gateway issues an audit request for the subscriber line to the switch controller 212. The switch controller 212 determines the status of the subscriber's line and informs Level 1 Gateway whether the line is in service but idle, in service and in progress, or out of service and idle. Similarly, the Level 1 Gateway 221 can initiate an audit of the status of a source line from a server. The Level 1 Gateway issues an audit request for the server line to the switch controller 212. The switch controller 212 determines the status of the source or server line and informs Level 1 Gateway. For example, if the server line is operative but not involved in a connection, the reported connection status of the server line is "in service but idle".

When the Level 1 Gateway 221 instructs the switch controller 212 to establish a broadband connection, the Gateway 212 expects a response from the controller 212 within a predetermined time interval. If the controller 212 does not respond within the predetermined time interval, the Level 1 Gateway 221 will send an ABORT message to the switch controller 212 to cancel the session establishment message. The Level 1 Gateway 221 also informs the level 2 gateway of the failure to establish a connection and provides an appropriate notice of the failure to the subscriber through the X.25 signaling call still existent with the DET 100. The Gateway 221 will also record the failure in an alarm file.

When the Level 1 Gateway 221 instructs the switch controller 212 to tear down a broadband connection, the Gateway 212 expects a response from the controller 212 within a predetermined time interval. If the controller 212 does not respond within the predetermined time interval, the Level 1 Gateway 221 will send an ABORT message to the switch controller 212 to cancel the original session establishment message, and the Gateway 221 will also record the failure in an alarm file.

Alternate Network Architectures

The above discussion has concentrated on operation of the Level 1 Gateway in the cross-connect switched type Video Dial Tone network, however, that Gateway will work equally well in a variety of other video dial tone network architectures with enhanced capabilities. Adaptation of the Level 1 Gateway to other network architectures principally requires only that, instead of interacting with a switch controller and digital cross-connect switches (DCS's), the Level 1 Gateway will interact with an asynchronous transfer mode (ATM) switch and some form of intermediate network control node, such as a Host Digital Terminal (HDT). The Level 1 Gateway may also conduct signaling communications with the DET's and the level 2 gateways through the ATM switch instead of through the X.25 packet switched system used in the Video Dial Tone Network of FIG. 1. The principal functionalities of the Level 1 Gateway discussed above, however, will generally remain the same.

Fiber-To-The-Curb

Figure 3B:
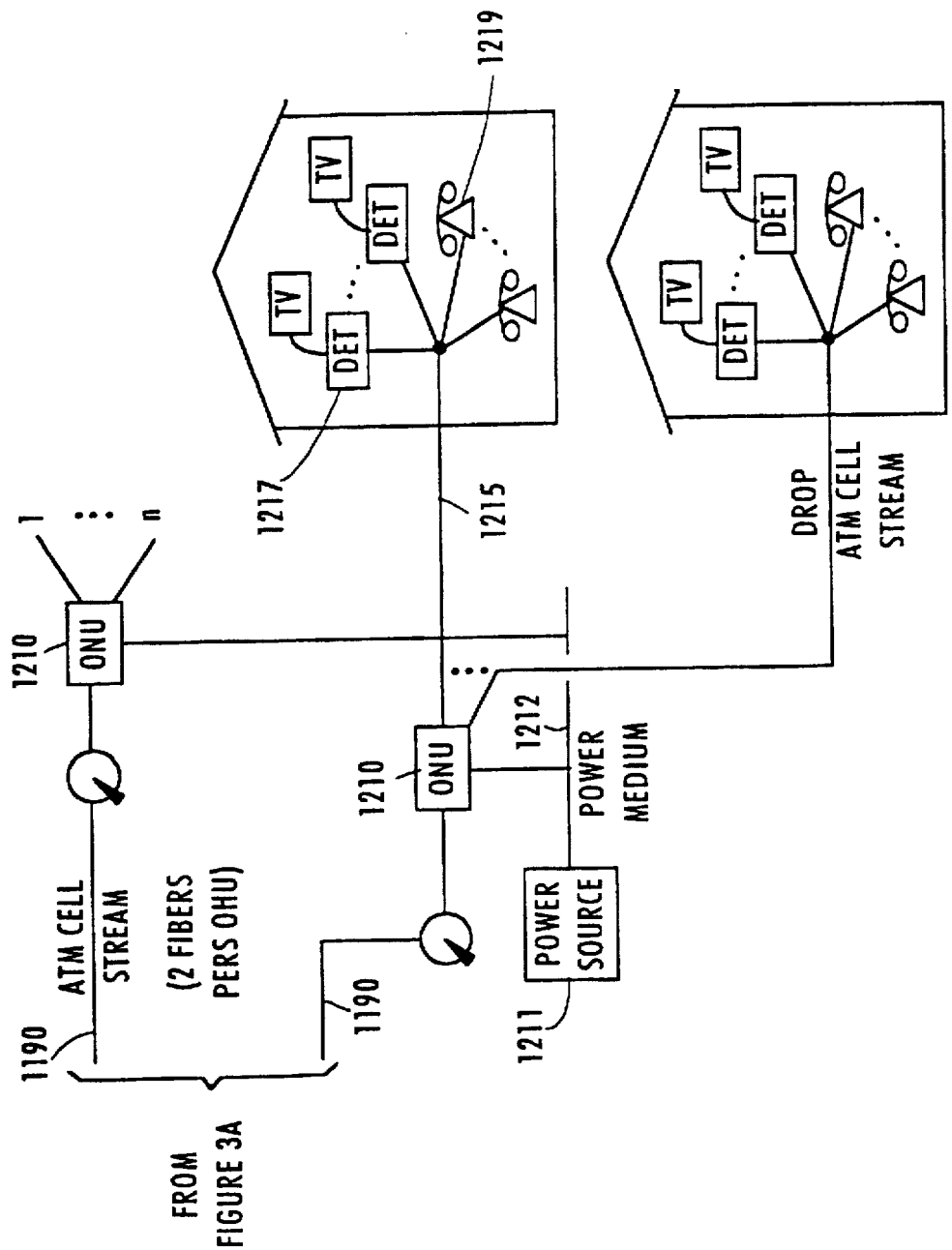

FIG. 3 depicts an example of one such advanced video dial tone network utilizing the Level 1 Gateway of the present invention. The illustrated network utilizes an advanced fiber to the curb system with ATM (Asynchronous Transport Mode) transport, and is similar to one of the networks disclosed in commonly assigned application Ser. No. 08/250,792, filed May 27, 1994, entitled "Full Service Network" (attorney docket no. 680-080), the disclosure of which is incorporated herein entirely by reference. The network of FIG. 3 uses essentially a switched star type architecture.

The Full Service Network illustrated in FIG. 3 provides broadcast video distribution, archival video services and interactive multi-media services as well as a suite of narrowband services including plain old telephone service. As illustrated in that drawing, the broadcast video services will initiate from a broadcast type server, such as ATM video source 1101. The broadcast server source 1101 includes an actual analog video source 1110. Although only one is shown, a typical broadcast service provider will have a plurality of such video sources in the same or separate server systems. The analog signal from the source is carried by any convenient means, such as an optical fiber, etc. Means (not shown) are provided as necessary to convert analog video transmission signals, e.g. NTSC broadcast signals, to baseband video and audio signals. The baseband signals are applied to a real time encoder 1120.

The real time encoder 1120 digitizes the audio and video signals and performs data compression. As currently envisaged, the encoder will encode the program signal into an MPEG 2 format.

The illustrated real time encoder 1120 preferably is set up as a bank of encoders to process six sets of analog audio/ video program signals in parallel. As such, the bank of encoders 1110 produces six 6 Mbits/sec MPEG 2 bit streams, which are combined together with appropriate overhead information into a single 45 Mbits/sec DS-3 type signal. The DS-3 signal from the encoder 1120 is input to an interworking unit (IWU) 1130. The interworking unit 1130 is the actual input point for the encoded broadcast video information into the Full Service Network of FIG. 3.

The Full Service Network uses asynchronous transfer mode (ATM) switching to transport all broadband or video information, including the broadcast video information. ATM is a packet oriented time division multiplexing technique. In ATM, information is organized into cells having a fixed length and format. Each cell includes a header, primarily for identifying cells relating to the same virtual connection, and an information field or "payload". In one proposal, a 53 octet ATM cell would include a cell header consisting of 5 octets and a payload consisting of 48 octets of data. One MPEG 2 packet would be mapped into payload data in four such ATM cells. Transfer is asynchronous in the sense that the recurrence of cells that contain information from any particular sender is not necessarily periodic. Each device using the ATM network submits a cell for transfer when they have a cell to send, not when they have an assigned or available transmission time slot. ATM allows any arbitrary information transfer rate up to the maximum supported by the ATM network, simply by transmitting cells more often as more bandwidth is needed. In an initial implementation of the Network of FIG. 3, however, all video materials will be transferred at a constant, standardized bit rate. Preferred later generations of the network will utilize the ATM capabilities of the network to permit transmission of video information over channels of different bit rates, e.g. 1.5 Mbits/sec, 3 Mbits/sec, 6 Mbits/sec, etc. It will also be possible to vary the bit rate during communication on an as needed basis.

The interworking unit 1130 grooms the continuous MPEG 2 bit streams of the broadcast services for ATM cell stream transmission over optical fiber transport links. For example, the interworking unit will divide the bit stream into appropriate length payloads and combine the payload data with appropriate cell headers, necessary for ATM transport. In an initial implementation, downstream links would carry an OC-12 bit rate, but higher rate transports such as OC-48 will be used in later implementations. Assuming use of OC-12, one such transport link will normally carry the equivalent of 112 DS-3's. However, conversion into ATM cell format with associated headers imposes added overhead requirements on the data transmissions. In the presently preferred embodiment, one interworking unit 1130 therefore processes up to ten DS-3 signals to produce an ATM bit stream at the OC-12 rate.

A transport interface 1140 converts the electrical signal from the interworking unit 1130 into an optical signal and transmits the optical signal through fiber 1150 to an adaptive digital multiplexer (ADM) identified in the drawing as a video bridging and insertion device 1160. The ADM 1160 performs three functions, passive bridging, active bridging and insertion of signals from other broadcast service providers (if any). The three functions may actually be separate, but in the preferred embodiment, all three would be performed by elements collocated within the one network component ADM 1160.

As noted above, the real time encoders 1120 each output a single DS-3 signal comprising up to 6 MPEG 2 bit streams. The interworking unit 1130 processes up to ten DS-3 signals to produce an ATM bit stream at the OC-12 rate. Consequently, one broadcast video source 1101 may produce as many as 60 channels of CATV type broadcast programming for transport over one OC-12 type SONET optical fiber 1150. Many providers, however, may not choose to broadcast so many channels. For example, the provider operating broadcast video source 1101 may offer only 42 channels. Such an ATM channel transmission on the optical fiber 1150 will not utilize the entire OC-12 channel capacity of that fiber. In the specific example, the 42 channels together require the equivalent of 7 of the available 10 DS-3's.

The illustrated architecture permits a second broadcast service provider to utilize the transport capacity not used by the first provider. The second broadcast service provider would offer additional channels from a separate second source 1101'. The source 1101' is essentially identical in structure and operation to the source 1101, but the source 1101' will offer up to the number of channels necessary to fill the OC-12 transport capacity. In the example, if the source 1101 transmits 42 channels (7 DS-3's) via the fiber 1150, the second source 1101' could transmit up to 18 additional channels (3 DS-3's). The function of the insertion device in the ADM 1160 is to combine the signals from the two sources into a single OC-12 rate signal (10 DS-3's in ATM cell format) for further transmission through the optical network.

The two bridging functions facilitate dissemination of the broadcast material throughout the entire Full Service Network. The passive bridging elements are optical splitters for splitting one OC-12 optical signal from the insertion device into a number of duplicates thereof, e.g. 1:2, 1:4, 1:8, etc. The active bridging elements convert an optical signal to an electrical signal, regenerate the electrical signal and convert the regenerated signal back to an optical signal for application to multiple output ports. The optical OC-12 output signals from the bridging components are transmitted over a large number of optical fibers 1170 to host digital terminals throughout the network service area. The host data terminal (HDT) 1180 is shown as a representative example.

When a subscriber requests a specific broadcast channel, the digital entertainment terminal (DET) in the subscriber's home provides a signal identifying the selected channel to the HDT 1180. The signaling between the digital entertainment terminal (DET) and the HDT 1180 will be discussed in more detail below. Inside the HDT, the ATM cell stream from an optical fiber 1170 is applied to a bus. To carry larger numbers of channels, there would be duplicate sources, insertion devices and bridging elements to transport the additional channels over fibers parallel to the illustrated fibers 1170. Signals from one or more such additional parallel fibers would be applied to corresponding parallel buses inside HDT 1180.

One HDT will communicate with a large number of optical network unit (ONU's) 1210, two of which are shown. The HDT will communicate with each ONU 1210 via a pair of optical fibers 1190. In the presently preferred implementation, each home or living unit will have as many as four DET's. Each ONU 1210 and the downstream fiber of the pair 1190 to the ONU 1210 will provide downstream video services to a number of homes, e.g. 8 to 24. The transmissions on the downstream fibers between the HDT and the ONU's 1210 are synchronous, although the video information remains in ATM cell format. Each DET served by an ONU 1210 is assigned a specified time slot on the downstream fiber of a pair 1190.

The HDT 1180 includes a component which is essentially a non-blocking type ATM switch. In response to the selection signal from a DET, the HDT 1180 accesses the appropriate bus and identifies each ATM cell on that bus for which the header information indicates that the cell represents information for the selected broadcast channel. The identified ATM cells are bridged by the ATM switch from the bus to a line card providing transmissions over the optical fiber 1190 to the particular ONU 1210 which services the requesting subscriber's premises. When the HDT selects each ATM cell for transmission to a specific DET, elements on the line card communicating with the particular ONU will buffer the cell as necessary and place the cell in the time slot for that DET on the downstream fiber of optical fiber pair 1190. The cells selected for a particular DET, together with cells going to other DET's served by the same ONU multiplexed into their respective time slots, are applied to an electrical to optical converter and transmitted over the downstream fiber to the ONU 1210 serving the particular subscriber's premises.

The basic purpose of the ONU is to desegregate the HDT side links into individual customer links and provide optical to electrical conversion for electrical delivery to the individual subscribers' premises. Although depicted by a single line in the drawing, in the currently preferred implementation, the drop cable to each subscriber's premises comprises a coaxial cable for carrying the video and/or two-way digital data signals and a twisted wire pair for carrying telephone signaling. Alternatively, ADSL communications over twisted wire pair could be used between the ONU and the subscribers premises. In the preferred embodiment, the ONU includes means to convert optical signals received over the downstream fiber to electrical signals and transmit signals from each DET's assigned time slot down over the coaxial cable to the subscriber's premises. The ONU also provides two-way conversion between optical and electrical signals for voice telephone service over the twisted wire pairs and for the signaling channels to/from the DET's.

A power source 1211 supplies −130V dc and battery reserve power for telephone service to the ONU's 1210. The power source 1211 may connect to the ONU's via twisted pairs, but in the preferred embodiment, the power is carried over a coax distribution cable.

The digital entertainment terminal (DET) 1217 is a programmable device to which different applications programs and/or portions of the operating system will be downloaded from a gateway device in order to permit the DET to interact with different information service providers and thereby offer the user totally different types of services. The DET may be similar to that used in the network of FIG. 1, with the exception that the network interface module within the DET 1217 provides the various broadband and signaling connections to a coaxial cable, instead of to an interface to an ADSL twisted wire pair type line, and the communication software within the DET is adapted to process ATM transported information.

The DET 1217 includes means (not shown) to demodulate received data and convert ATM cell stream data into bit stream data for further processing. As in the earlier embodiment, the DET 1217 also includes a digital signal processor to decompress received video signals as well as a graphics display generator for generating displays of text data, such as the initial turn-on selection menu. The DET will also include a digital to analog converter and appropriate drivers to produce output signals compatible with a conventional television set. Each DET 1217 also includes the means to receive selection signals from a user and transmit appropriate data signals over a narrowband channel on the coaxial drop cable to the ONU 1210.

The ONU multiplexes the user input data signals from the DET's it services together and transmits those signals to the HDT over an upstream fiber of the optical fiber pair 1190. The HDT transmits the upstream control signals to control elements referred to as gateways. In an initial implementation, the HDT's communicate with the gateways through an X.25 type data network. Future implementations will use ATM communications for the signaling.

In the network of FIG. 3, the Level 1 Gateway 1230 provides primary control of all routing and access functions of the network and accumulates various usage statistics, in a manner substantially similar to that of the Level 1 Gateway 221 in the network of FIG. 1. The control functions include controlling access to broadcast programs by individual subscribers. Control of access to on demand programming and interactive multimedia services through a PVC controller 1420 and an ATM switch 1410 will be discussed in more detail below. The Level 1 Gateway also will transmit narrowband information to the DET 1217 instructing it to initiate display of various selection menus of available video information service providers.

The Level 1 Gateway connects to a service administration module (SAM) which maintains a data base of video information service providers and customer profile data for the broadcast, archival and interactive video services available through the network. This data may include customized menus, pre-subscription information, identification of impulse pay per view events and premium channels, etc. Under different circumstances, the video information providers and/or the individual customers can access this data for provisioning. The Level 1 Gateway also connects to an operations support module (OSM). The operations support module provides an interface to standard operating support systems used for additional network provisioning functions.

When the subscriber selects a specific broadcast channel, the DET 1217 transmits data upstream through the various network elements to the Level 1 Gateway identifying the selected channel. In response, the Level 1 Gateway 1230 accesses stored data regarding the broadcast services to which the customer currently subscribes. If the customer subscribes to the requested service, the Level 1 Gateway 1230 transmits an instruction to the HDT 1180 to route the cells for that channel to the subscriber's DET 1217 in the manner discussed above. If the customer is not currently a subscriber to that service, the Level 1 Gateway 1230 transmits a data message back to the DET 1217 instructing it to provide an appropriate television display, e.g. informing the customer of a service denial and/or asking the subscriber for appropriate inputs to initiate a new subscription.

The above selection procedure through the Level 1 Gateway provides the Gateway 1230 with information as to each selection a subscriber makes and when the selection is made. The Level 1 Gateway also receives information as to when a DET session ends, e.g. upon turn-off of the DET or upon request for a session with a different provider. As such, the Level 1 Gateway has all information necessary to accumulate a variety of statistics as to viewer usage both for billing purposes and for audience accounting purposes.

As an alternative to the real time control of broadcast program selection and access by the Level 1 Gateway discussed above, certain relevant control data could be downloaded to the HDT, either from the Gateway 1230 or from the service administration module (SAM). With this modification, the broadcast VIP's would provide provisioning data to the SAM, and the SAM periodically downloads that data to the appropriate HDT's, either directly or through the Level 1 Gateway 1230.

The provisioning data downloaded to the HDT's 1180 would include channel mapping information and subscriber authorization control information. The channel mapping information specifies what programs are carried on each ATM virtual circuit, within each DS-3, on each respective optical fiber 1170. The HDT 1180 accesses the channel mapping information in response to each program selection by a subscriber to route the ATM cell stream to the requesting DET. The authorization control data would indicate which program each subscriber is authorized to access, e.g. because that party has subscribed to the particular program service and is not delinquent in bill payments. When a subscriber requests a program, the HDT 1180 would check this data to determine whether or not to supply the program to the subscriber's DET 1217. As the HDT 1180 routes selected channels to the DET's 1217, the HDT would accumulate usage data and/or pay per view event purchase data for the subscribers serviced thereby. The HDT 1180 would periodically upload such usage data to the Level 1 Gateway 1230 and/or to the SAM for subsequent transmission to appropriate billing systems of the network service provider or the VIP's, respectively.

In addition to broadcast video, the network of FIG. 3 offers subscribers access to other wideband services, such as video on demand and interactive multimedia services.

Access to these additional broadband services is through an ATM switch 1410. As discussed in more detail below, the access through this switch is controlled by the Level 1 Gateway 1230 in a manner quite similar to the routing to a VIP in the network of FIG. 1.

Each of the non-broadcast service providers 1400 will have a level 2 gateway 1401 and some form of file server 1403. The video information provider's (VIP's) system may provide ATM cell stream outputs for transmission through the network. Alternatively, if the provider's equipment transmits only bit stream data, the network operator would supply an interworking unit similar to the unit 1130 discussed above to convert the provider's bit stream data into an ATM cell stream format compatible with the Full Service Network. The ATM switch transmits selected ATM cells via optical fibers 1415 to the HDT's 1180.

To establish a broadband communication session or connection through the network between an interactive information service provider 1400 and a particular DET 1217 requires establishment of a virtual circuit through the ATM switch 1410 and the appropriate HDT 1180. In the network of FIG. 3, a PVC controller 1420 stores data tables defining all possible virtual circuits through the ATM switch and the HDT's to each terminal of a customer subscribing to a particular provider's services. These data tables define the header information and the particular fiber output port used to route cells to the correct HDT and the time slot information on the downstream fiber to the appropriate ONU serving each DET. The data tables thus define "permanent virtual circuits" (PVC's) between the providers and the DET's.

When a subscriber initiates a session with a broadband interactive service provider, for example VIP 1400, the subscriber's DET 1217 provides an appropriate "off-hook" signal to the HDT 1180. The HDT 1180 sends the message through the X.25 packet switched network to the Level 1 Gateway 1230. When the Level 1 Gateway 1230 receives the addressed message from the HDT, that Gateway uses the X.121 address of the caller included in the message to check its internal database to determine if the caller is a valid network customer. If the caller is not a valid customer, the system tears downs the session. If the caller is a valid customer, the Level 1 Gateway 1230 transmits an X.25 call accept message back to the terminal and waits for the first application level message.

Once the call is accepted and an X.25 signalling link is provided, the DET 1217 sends an initiation message that says "hello". This "hello" message includes basic information such as a customer premises equipment (CPE) identifier and a CPE type designation. The Level 1 Gateway 1230 sends a menu and a banner through the downstream signaling channel, as in the earlier network embodiment. As discussed above, the menu is a screen of text listing VIP's available to this customer or the VIP's that the customer as previously selected for purposes of her customized menu presentation. The subscriber reviews the menu on their television set, and operates the arrow keys on the DET remote control to move a cursor across the menu to an appropriate point on the screen, after which the user presses an <ENTER> key on the keypad or remote control. In response to the VIP selection input, the DET 1217 transmits an appropriate data signal upstream through the network to the Level 1 Gateway 1230.

The Level 1 Gateway may execute a PIN number access routine, as in the earlier embodiment, if the subscriber has previously requested such access control for selected ones of the VIP's. For simplicity here, it is assumed that the currently selected VIP is not subject to such a PIN number requirement. The Level 1 Gateway is merely expecting to receive the VIP selection input from the DET within a predetermined period following the menu transmission. If the Level 1 Gateway receives the selection input message from the DET within the predetermined period, the Gateway 1230 translates that message into the 4 digit code for the selected VIP's level 2 gateway.

At that time, the Level 1 Gateway sends a message to the DET saying please wait while we connect to the VIP. The Level 1 Gateway then goes over the X.25 network to communicate with the selected VIP's level 2 gateway. Assuming that the subscriber selected VIP 1400, the Level 1 Gateway 1230 contacts the level 2 gateway 1401 and indicates that it has a customer calling. The Level 1 Gateway 1230 identifies the customer to the level 2 gateway 1401 by sending the standard billing telephone number for the calling customer to the level 2 gateway. The CPE identification information and the CPE-type information that was sent in the initial origination message is also sent to the level 2 gateway (VIP) at this time. The VIPIs level 2 gateway may accept or reject the call after receiving the initial request indicating a customer is available, as in the network of FIG. 1. If the level 2 gateway 1402 sends a message back to the Level 1 Gateway 1230 indicating a rejection of the call, the Level 1 Gateway transmits a message to the DET 1217 instructing that terminal to display some form of call rejection notice on the associated TV.

Alternatively, the level 2 gateway 1401 accepts the call, provides a server output port and gives a port identification for the port on the server 1403 to the Level 1 Gateway 1230. In response, the Level 1 Gateway transmits the X.121 address of the calling customer's DET 1217 to the level 2 gateway 1401. The level 2 gateway uses that address to initiate a new signaling communication through the X.25 network 1220 with the subscriber's set-top terminal DET 1217. The Level 1 Gateway identifies the broadband communication link number for the channel going out from the HDT to the requesting customer's DET 1217. The Gateway 1230 sends a message to the PVC controller 1420 to establish a virtual circuit between the selected provider 1400 and the subscriber's DET 1217. The PVC controller accesses its data tables to identify an available permanent virtual circuit between the provider 1400 and the DET 1217 for which all necessary elements are currently available. When an available circuit is identified, the PVC controller 1420 provides appropriate instructions to the ATM switch 1410 and informs the Level 1 Gateway 1230 of the virtual circuit identifier. The Level 1 Gateway 1230 informs the HDT 1180 of that virtual circuit identifier and instructs the HDT 1180 to "lock-up" that circuit as a currently active virtual circuit providing broadband communications from the server 1403 of the provider 1400 to the subscriber's DET 1217.

If the broadband communication connection is successfully established between the VIP's server port and the customer's DET, the PVC controller 1420 transmits back an appropriate indication thereof to the Level 1 Gateway 1230. Then the Level 1 Gateway tears down its own X.25 signaling connection with the subscriber's set-top terminal. At the same time, the Level 1 Gateway 1230 informs the level 2 gateway 1401 that it has set up a good broadband link, and the Level 1 Gateway initiates a billing record for the call. Alternatively, if the PVC controller 1420 informs the Level 1 Gateway 1230 that it could not establish the broadband connection, the Level 1 Gateway passes that information on to the level 2 gateway 1401 and provides an appropriate message for display by the DET 1217 informing the customer.

During the communication session between the subscriber and the VIP 1400, the DET can transmit control signalling upstream through the ONU 1210 the HDT 1180 and the X.25 data network to the level 2 gateway 1401. The level 2 gateway can also send signaling information, such as control data and text/graphics, downstream through the same path to the DET 1217. For downstream transmission, the server 1403 will provide ATM cells with an appropriate header. The ATM switch 1410 will route the cells using the header and transmit those cells over fiber 1415 to the HDT serving the requesting subscriber. The HDT 1180 will recognize the header as currently assigned to the particular DET 1217 and will forward those cells through the downstream fiber of pair 1190 and the ONU 1210 to that DET, in essentially the same manner as for broadcast programming.

When a broadband session ends, e.g. as indicated by an exchange of appropriate messages between the DET 1217 and the level 2 gateway 1401, the level 2 gateway instructs the Level 1 Gateway 1230 to tear down the broadband connection. The instruction includes the customer's billing telephone number and the server port identification for the VIP port used for the broadband communication. In response, the Level 1 Gateway 1230 stops the billing timing for that broadband session and transmits and instruction through the PVC controller 1420 to tear down the broadband connection between the server port and the customer's broadband port. As in the network of FIG. 1, the Level 1 Gateway creates a log record of the interactive broadband call for purposes of billing the VIP 1400 for the broadband connect time.

The Full Service Network illustrated in FIG. 3 will also provide narrowband transport for voice and narrowband data services. A digital switch 1310 or an analog switch 1330 will provide standard type plain old telephone service (POTS) for customers of the Full Service Network. The digital POTS switch provides a DS-1 type digital input/output port through interfaces conforming to either TR008 or TR303. The output may go to a digital cross-connect switch (DCS) 1320 for routing to the various HDT's or directly to a multiplexer (MUX) 1325 serving a particular HDT. The MUX 1325 may also receive telephone signals in DS-1 format from the analog switch through a central office terminal 1333. The central office terminal 1333 converts analog signals to digital and digital signals to analog as necessary to allow communication between the analog switch 1330 and the rest of the network.

The MUX 1325 serves to multiplex a number of DS-1 signals for transmission over one fiber of an optical fiber pair 1335 to the HDT 1180 and to demultiplex signals received over the other fiber of the pair 1335. The fiber pairs between the HDT 1180 and the ONU's 1210 will also have a number of DS-1 channels to carry telephone and narrowband data signals to and from the subscriber's premises. The subscribers' drops 1215 include both a coaxial cable and one or more twisted wire pairs. In addition to the video services discussed above, the ONU will provide telephone signals and appropriate power to the subscribers' premises over the twisted wire pairs connected to subscribers' telephone sets 1219. The ONU's will also provide two-way narrowband data communication to the DET's in narrowband channels over coaxial cable.

Hybrid Fiber—Coax

Figure 4:
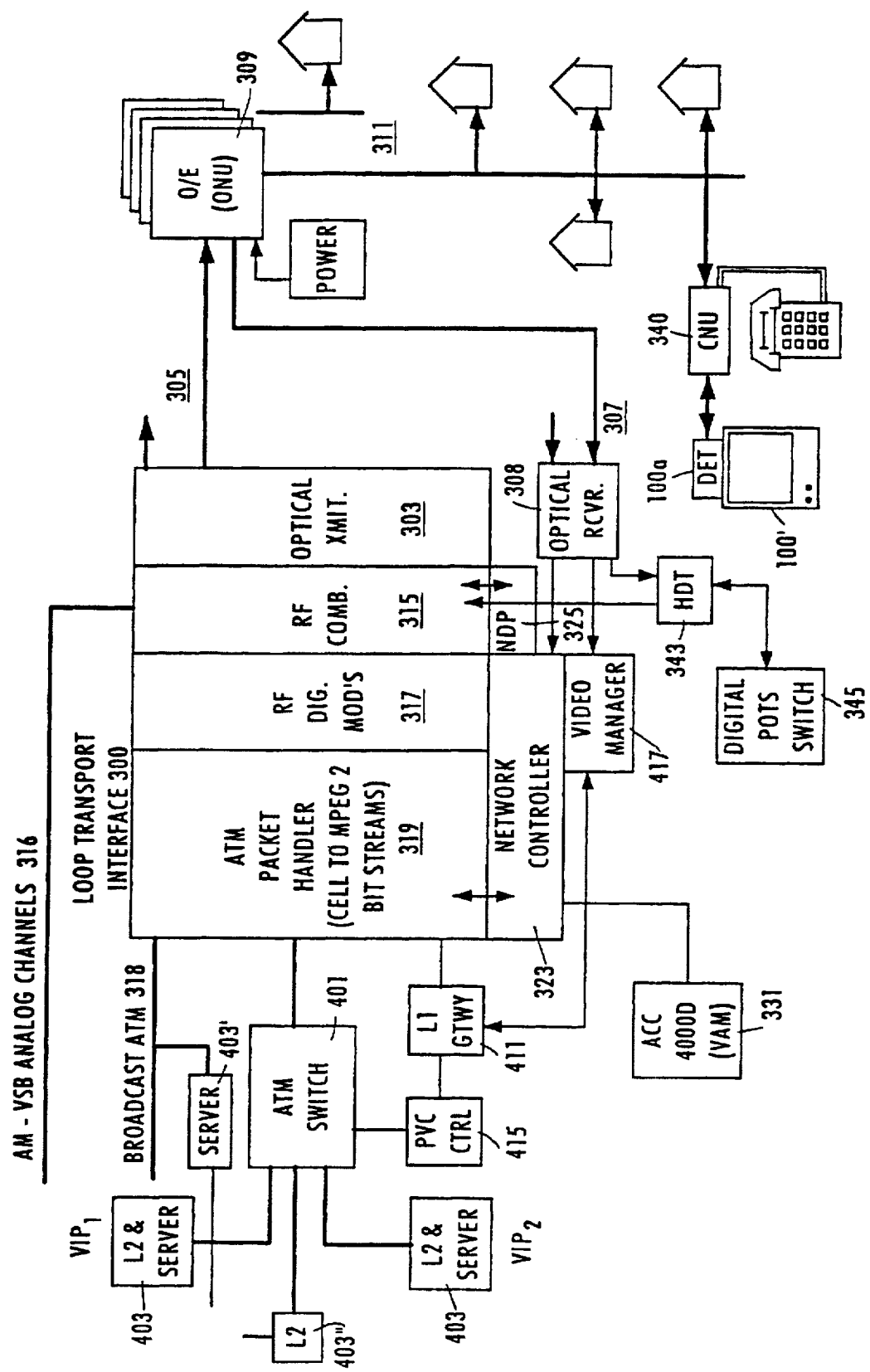
FIG. 4 illustrates a hybrid fiber coax network architecture incorporating the Level 1 Gateway of the present invention.

FIG. 4 depicts an alternate implementation of a further video network utilizing a Level 1 Gateway in accordance with the present invention. The network of FIG. 4 is a hybrid fiber-coax system which provides RF transport of both analog and digital broadband services. The illustrated network provides broadcast video distribution, archival video services and interactive multi-media services as well as plain old telephone service.

Within an area containing a large number of subscribers, such as a LATA, a telco deploys a number of Loop Transport Interfaces 300, only one of which appears in the drawing (FIG. 4). At least as currently envisaged, each Loop Transport Interface 300 will be located in a telco central office. In an area serviced through multiple central offices, several different central offices would each have a Loop Transport Interface similar in structure to the Interface 300 depicted in FIG. 4. In some respects, each Loop Transport Interface will serve as the headend of an otherwise conventional optical fiber trunk and coaxial cable type CATV distribution network.

In the Loop Transport Interface 300, a laser type optical transmitter 303 transmits downstream signals through fibers 305 to optical to electrical nodes referred to as "optical network units" or ONU's. The laser operates in a linear mode in the range of 5–750 MHz. The transmitter has an optical splitter and can transmit to several ONU nodes 309. Each ONU 309 performs optical to electrical conversion on the downstream signals and supplies downstream RF electrical signals to a coaxial cable distribution system 311.

The optical transmitter receives and transmits signals from an RF (radio frequency) combiner 315. The combiner 315 combines and levelizes RF signals from several sources to produce the appropriate signal spectrum for driving the optical transmitter 303. One set of signals 315 supplied to the RF combiner will be group of AM-VSB (amplitude modulated vestigial sideband) analog television signals from one or more appropriate sources not separately shown. Such signals are essentially "in-the-clear" CATV type broadcast signals capable of reception by any subscriber's cable ready television set.

The analog television signals are broadcast from the optical transmitter 303 through the tree and branch optical and coax distribution network to provide "basic" CATV type service to all subscribers on the network. For subscribers choosing only analog television service who do not have a cable ready television, the Network operating company offers a standard CATV type analog frequency converter, or the subscriber could choose to purchase a converter on the open market. The network interface module in the DET 100a will also include a tuner that permits subscribers to the digital services to receive the analog broadcast channels through the same equipment used for the digital services.

The Network depicted in FIG. 4 also provides transport for digitized and compressed audio/video programming, both for certain broadcast services and for interactive services, such as video on demand. Such programming will be encoded and compressed in MPEG-2 format. As discussed in more detail below, the present invention permits specific use of MPEG encoded materials to offer a variety of interactive services without continuously utilizing a full MPEG encoded broadband channel to transport information to the subscriber's DET 100'.

In the illustrated Network, the MPEG encoded video is transported to each Loop Transport Interface using asynchronous transfer mode (ATM) transport and switching. As noted above, ATM information is organized into cells each comprising a header, primarily for identifying cells relating to the same virtual connection, and an information field or "payload". The ATM cell header information includes a virtual circuit identifier/virtual path identifier (VCI/VPI) to identify the particular communication each cell relates to. For example, for broadcast signals, the VCI/VPI will identify a particular program channel. For a point to point transmission, e.g. for video on demand, the VCI/VPI in each header of the ATM cells would effectively identify a specific end point of the virtual communication link.

In the illustrated network, digital broadcast service signals 318 in MPEG encoded form and arranged in ATM cell packets are applied to an ATM packet handler 319 in the Loop Transport Interface 300. These broadcast service signals originate in one or more broadcast VIP's ATM servers which are essentially the same structure as the servers/sources 1101, 1101 shown in FIG. 3. The ATM broadcast services will carry premium service type programming. The ATM broadcast signals may originate from any appropriate source (not shown). For certain interactive services which utilize one digitized channel to provide limited downstream transport to a large number of subscribers, the ATM broadcast cell stream signals originate from a server 403', as discussed in more detail below. Fully interactive broadband digital signals, in MPEG-ATM format, are also applied to the ATM packet handler from an ATM switch 401. The ATM packet handler 319 terminates all ATM cell transport through the Network. This handler receives the ATM cell streams and converts the cell payload information into MPEG 2 bit streams.

In addition to the analog broadcast signals, the RF combiner 315 which prepares signals for downstream transmission by the optical transmitter 303 receives a variety of other analog RF signals from a group of RF digital modulators. The RP analog outputs from the modulators carry digital broadband information. The content for the digital RF modulators comes from the ATM packet handler 319. A network controller 323 and an associated network data processor (NDP) 325 use the VCI/VPI header from the ATM cells to control the ATM packet handler 319 to route the MPEG bit streams to the appropriate ones of the digital RF modulators 317.

U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six MHz channel allocation for transmission over a CATV type distribution network. The currently preferred implementation uses 64 QAM (quadrature amplitude modulation) or 16 VSB (vestigial sideband) modulation techniques in the RF modulators 317 in the Loop Transport Interface 300. Using 64 QAM, 4 channels of 6 Mbits/s MPEG encoded digital video information can be modulated into one 6 MHz bandwidth analog channel. Similarly, 16 VSB yields 6 channels of 6 Mbits/s MPEG encoded digital video information modulated into one 6 MHz bandwidth analog channel. Each RF modulator produces a 6 MHz bandwidth output at a different carrier frequency.

The 6 MHz bandwidth RF signals from the modulators 317 are supplied to the optical transmitter 303 for downstream transmission together in a combined spectrum with the AM-VSB analog television signals 316. The downstream transport of the digital programming is an RF transmission exactly the same as for the analog basic service channels, but each of the channels from the RF modulators 317 contains 4 or 6 digitized and compressed video program channels, referred to hereinafter as "slots". The 6 Mhz digital program channels will be carried through the fiber and coaxial system in standard CATV channels not used by the analog basic service programming. The ONU 309 is essentially transparent to both the analog basic service channels and the channels carrying the digital programming and supplies all of the signals as a combined broadcast over the coaxial cable network 311. The optical fiber 305 from the transmitter, the ONU's 309 and the coaxial distribution systems 311 therefor provide a broadcast network transporting all downstream programming to all subscriber premises serviced thereby.

At the subscriber premises, a network interface module (NIM) couples the set-top device or digital entertainment terminal (DET) 100a to a drop cable of the coaxial distribution network 311. In this Network configuration, the NIM includes an analog frequency tuner controlled by the microprocessor 100 (FIG. 1) to selectively receive the RF channel signals, including those channels carrying digital information. The NIM also includes a QPSK, QAM or VSB demodulator to demodulate a selected one of the digitized program signals carried in one of the digital slots within a received 6 MHz channel and will perform a forward error correction function on the demodulated data. The digital audio/video signal processor 125 within the DET decompresses received video signals, generates graphics display information and performs digital to analog conversion to produce output signals compatible with a conventional television set 100', exactly as in the earlier embodiments.

The analog tuner in the NIM will tune in all channel frequencies carried by the network, including those used for the analog broadcast services. The DET 100a includes a bypass switch or the like and an analog demodulator to selectively supply analog signals from the basic service channels directly to the audio/video output terminals or to the modulator, to provide signals to drive a standard television receiver. The DET 100a therefore can be used as a frequency converter for reception of the analog signals.

As in the earlier embodiments, each DET 100a includes a remote control and/or keypad to receive various selection signals from a user. At least in response to certain user inputs, such as selection of a pay per view event, the DET will relay data signals upstream over a signaling channel on the coaxial cable to the ONU 309. The actual transmission of any such data signals upstream from the DET 100a occurs in response to a polling of the DET by the ONU 309. The ONU 309 combines upstream data signals from the DET's serviced thereby and transmits those signals upstream over another optical fiber 307 to an optical receiver 308 in the Loop Transport Interface 300. Each DET 100a may transmit data on a different carrier frequency, in which case the network controller knows which DET sent particular data based on the received frequency channel. Alternatively, for interactive services, the DET may transmit a unique identification code with the upstream message.

Certain digital program signals carried on the network may be encrypted using encryption technology and key codes. Details of specific encryption algorithms, the key codes and the precise techniques for downloading the key codes to the DET's are well known to those skilled in the art and familiar with the relevant patents and literature.

In the implementation of the network illustrated in FIG. 4, an ACC 4000D 331 serves as a video administration module (VAM). The ACC 4000D or VAM performs set top management and specific program access control functions. In particular, service profiles for each customer on the network and their DET's are set up and stored within the Level 1 Gateway 411. The Level 1 Gateway 411 may also provide an interface to appropriate billing systems (not shown) for some broadcast services, such as pay per view. For ATM broadcast services, when a subscriber first signs up, a portfolio of channels subscribed to by that customer is established in the subscriber's profile data within the VAM 331. Based on this profile data, the VAM will download a service map into the subscriber's DET 100a. The downstream transmission portion of the network provides an out-of-band downstream signalling channel to the DET's, for example for the downloading of the service map information from the VAM 331 to each DET 100a. This downstream signaling channel also carries signals for controlling software downloading and/or selection of certain channels or frames for decoding in interactive services.

All digital broadcast service signals are broadcast into each subscriber's premises, and each DET 100a includes means for receiving and decoding each such digital broadcast service channel, as discussed above with regard to FIG. 1. The microprocessor in the DET 100a controls access to any of these channels based on the downloaded map information stored in the system memory. For example, if one subscriber requests HBO, and that subscriber has paid to subscribe to HBO, the subscriber's DET 100a will contain map information instructing it to tune the RF channel and select and decode the digital program slot carrying HBO for display on the subscriber's television set 100'. However, if a requesting subscriber has not paid for HBO, the downloaded service map will not provide the requisite data for tuning and decoding of that channel.

The illustrated Network also offers pay per view services through the ATM broadcast program channels 318. A user selects a pay per view event by operating the DET 100a. The DET 100a transmits a purchase message upstream through the Loop Transport Interface 300 to the Level 1 Gateway 411. If the authorization data in the subscriber's profile in the Level 1 Gateway indicates that the DET identification is valid and the subscriber is authorized to purchase such events, the Level 1 Gateway instructs the video manager 417 to authorize reception (and provide a decryption key if needed). In response to an appropriate instruction from the Level 1 Gateway 411, the DET 100a decodes the pay per view event in essentially the same manner as for other premium services carried on the ATM broadcast channels 318, as outlined above. If the decryption key is needed, the Level 1 Gateway 411 actually instructs the video manager 417 to instruct the VAM 331 to transmit the key to subscriber's DET 100a.

The implementation of the network illustrated in FIG. 4 also provides telephone service. Between the optical network unit and the subscriber premises, the 700–750 MHz portion of the spectrum on the coaxial cable will carry the telephone signals. This allocated spectrum provides transport for 24 DS0 telephone channels. Each subscriber premises will have telephone interface referred to as a Cable Network Unit (CNU) 340 coupled to the coaxial cable which serves to couple two-way signals between a twisted wire pair into the home and the telephone frequency channels on the coaxial cable 311.

Carrier frequencies used for telephone services may be individually assigned to particular subscriber's CNU's. Also, the telephone signal spectrum is carried on the same two fibers that carry the video and the upstream signalling between the Loop Transport Interface and the ONU. Upstream telephone signals are applied from the optical receiver 308 to a host digital terminal (HDT) 343 which provides an interface to a standard digital telephone switch 345. Downstream telephone signals from that switch pass through the HDT 343 to the RF combiner 315 for transmission in the 700–750 MHz frequency range over the fiber to the ONU 309 and the coaxial cable distribution system 311.

In an alternate implementation not shown, the Loop Transport Interface 300 would dynamically allocate the DS0 channels on the coaxial cable system 311 on a timesharing basis, in essentially the same manner as in mobile radio systems. Two additional fibers and a second optical transmitter and receiver pair would carry the two-way telephone signals to and from the ONU 309. Because of the use of the separate optical links for telephone service in this alternate implementation the HDT and telephone switch need not be closely associated or collocated with any particular one of the Loop Transport Interfaces.

Battery power for telephone service and for the various interfaces will be applied through the ONU's 309 and supplied downstream over the coaxial cable.

The implementation of the network illustrated in FIG. 4 offers access to video information providers (VIP's) for interactive broadband services, such as video on demand. For archival services and many other interactive services, each VIP has a level 2 gateway and some form of broadband information file server 403. The ATM switch 401 provides communications links between the Loop Transport Interfaces 300 and the level 2 gateways and file servers 403. Customer access to the VIP's is controlled through one or possibly more programmed computer or processor elements performing the processing functions of the Level 1 Gateway 411. A permanent virtual circuit (PVC) controller 415 and a video manager 417 respond to signals from the Level 1 Gateway to control the point to point routing through the Network.

The PVC controller 415 stores data tables defining all possible virtual circuits through the ATM switch 401 and the Loop Transport Interface 300 serving each DET terminal of a customer subscribing to each particular provider's services. These data tables define the header information and the switch port to the packet handlers needed to route cells to the correct Loop Transport Interface. The video manager 417 stores similar data tables identifying the transmission fiber ports, RF channels and multiplexed digital channel slots which may be used to transport each data stream processed by the ATM packet handler 319 through the fiber 305 to the appropriate ONU 309 serving each DET. The data tables in the PVC controller 415 and the video manager 417 thus define "permanent virtual circuits" between the VIP's equipment 403 and the DET's 100a.

For a full, broadband interactive session, the subscriber operates the DET 100a to interact with the Level 1 Gateway 411 and select a VIP in a manner similar to the operation in the network of FIG. 1. The PVC controller 415 responds to instructions from the Level 1 Gateway by activating the ATM switch 401 to establish a downstream virtual circuit path between a port of the VIP's server and the ATM packet handler within the Loop Transport Interface 300 servicing a subscriber requesting a call connection to the particular VIP. The video manager 411 assigns a particular one of the digitized video channel slots in a digital program type RF channel to carry the particular point to point communication. Specifically, the video manager controls the ATM packet handler 319 to route MPEG data recovered from the ATM cells for the particular point to point communication to the port for one of the RF modulators 317 so that the modulator will include the MPEG data in the assigned digital channel slot within a particular 6 MHz RF channel. The video manager 417 also transmits a signal downstream through the signaling channel to the subscriber's DET 100a instructing the DET to tune to the particular RF channel and decode MPEG data from the specifically assigned digital channel within that RF channel. Similar dynamic assignments of RF channels on a CATV system to individual terminals for interactive services are disclosed in U.S. Pat. No. 5,220,420 to Hoarty et al. and U.S. Pat. No. 5,136,411 to Paik et al., the disclosures of which are incorporated herein in the entirety by reference.

Concurrently, the Level 1 Gateway 411 would instruct the PVC controller 415 to control the ATM switch 401 to establish an upstream virtual circuit for control signals sent from the DET 100a up through the fiber-coax network and receiver 308 to the VIP's level 2, gateway. The combination of upstream and downstream, point to point channels are used for downloading of operating system and applications software and for interactive service communications in essentially the same manner as in the Video Dial Tone Network of FIG. 1.

As noted above, the Level 1 Gateway 411 receives status and failure notifications as part of its ongoing operations. These functions of the Gateway 411 are quite similar to those of the Gateway 212 in the network of FIG. 1 except that the Gateway 411 receives event notifications from more elements of the network. Also, in the presently preferred embodiment of the network of FIG. 4, the function of monitoring communications between the loop transport interface 300 and individual subscribers' DET's 100a is an automatic function of the video manager 417. In such an embodiment, there is no longer a need for the video provider service center (VPSC).

The video manager monitors 417 operations of the loop transport interface 300. As part of its monitoring function, the video manager 417 also determines the status of communications to each DET 100a. As such, the video manager automatically knows the status of all components between the input ports to the loop transport interface and the output ports of the DET's 100a.

A variety of known techniques can be used to check the status of communications to the individual DET's. For example, the video manager 417 could periodically transmit a status interrogation signal to each DET 100a, through the out-of-band signaling channel. If currently operable, the DET would transmit a status message back upstream through the signaling channel informing the manager 417 of the DET's status, e.g. operable but idle or operable and actively in-service. A DET 100a detecting some problem could transmit a fault signal upstream through the signaling channel to the video manager 417, either immediately in response to fault detection or in response the next periodic interrogation by the video manager. The video manager 417 would also interpret a failure of a DET 100a to respond to an interrogation or to confirm any other message sent to the DET within a predefined period of time as a fault condition.

During the call set up processing, the Level 1 Gateway 411 may receive an indication from the PVC controller 415 and/or the video manager 417 that one or both can not establish a desired broadband connection. The PVC controller 415 also monitors ongoing operations of the ATM switch 401, and the video manager 417 monitors communications through the loop transport interface 300 at all times, and each will inform the Level 1 Gateway 411 upon detection of any fault or interruption in any currently established broadband connection. The level 1 Gateway 411 transmits notice of an inability to establish a desired broadband session through the signaling channel to the requesting DET 100a, using notices such as shown in FIGS. 2F and 2G depending on whether or not other VIP's are available to the particular subscriber at the time of the call. If the Level 1 Gateway 411 receives notice of a fault in an already established session, the Gateway 411 stops accumulating billing data for that session and transmits a message regarding the failure to the VIP's level 2 gateway. The level 2 gateway may provide an appropriate notice to the subscriber through the signaling link, if that portion of the session is still operative. Alternatively, the Level 1 Gateway may transmit an appropriate display notice to the DET 100a through the signaling channel.

When the Level 1 Gateway 411 instructs the PVC controller 415 and the video manager 417 to tear down a broadband communication session, the Gateway 411 expects responses from both of those controllers 415, 417 within a predetermined time interval. If either the PVC controller 415 or the video manager 417 does not respond within the predetermined time interval, the Level 1 Gateway 411 will send an ABORT message to the non-responsive controller 415 or 417 to cancel the original session establishment message, and the Gateway 411 will also record the failure in an alarm file.

Figure 5:
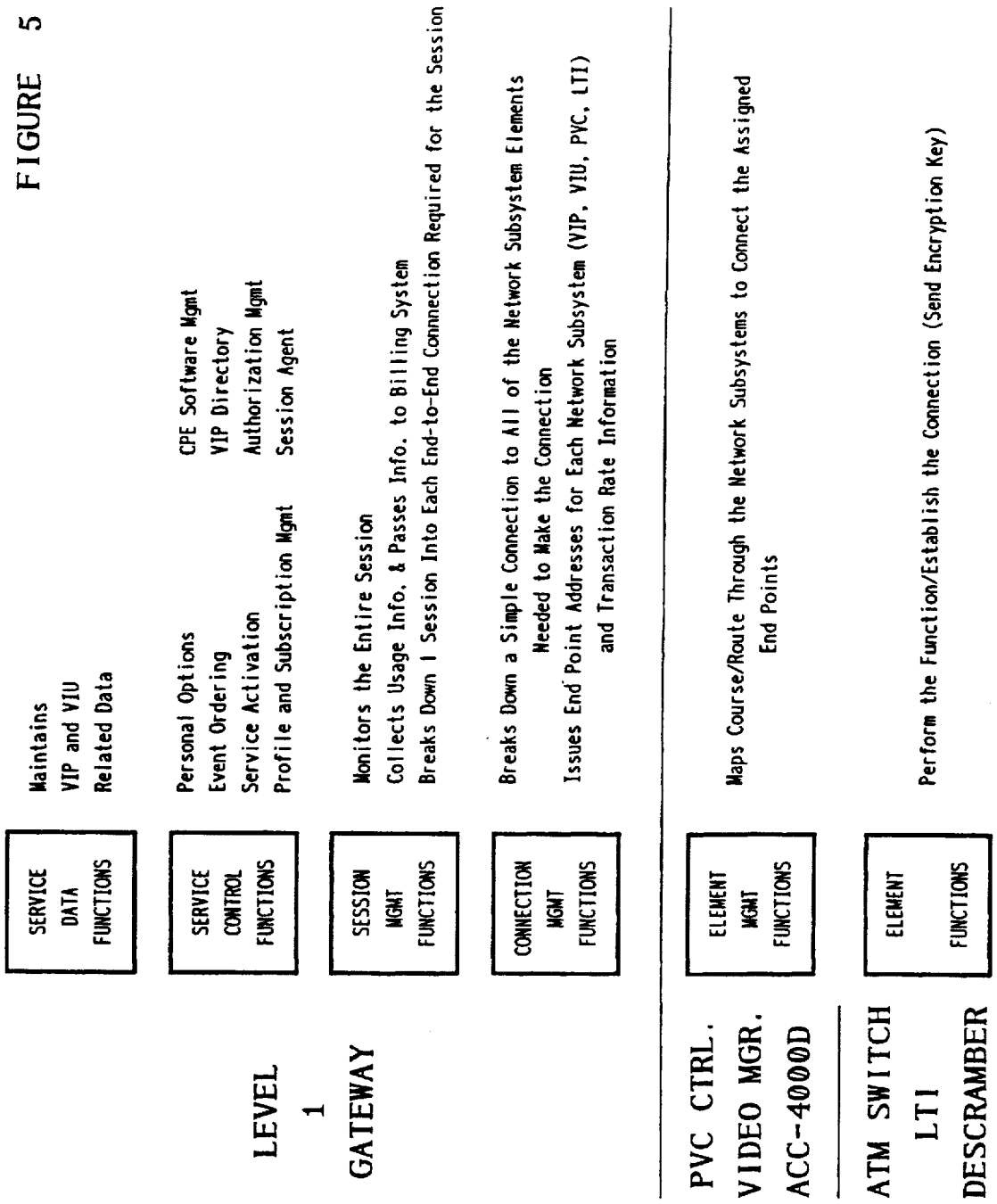
FIG. 5 presents a high-level overview of the control functions of a network of the type shown in FIG. 4 and delineates those functions performed by the Level 1 Gateway from those performed by other network components.

FIG. 5 depicts a functional hierarchy stack of the software and network operations relating to the Level 1 Gateway implementation in the hybrid fiber-coax network of FIG. 4. As shown in FIG. 5, the network functionality can be conceptually divided into six block elements, service data functions, service control functions, session management functions, connection management functions, element management functions and actual element functions. The service data functions, service control functions, session management functions, and connection management functions all are performed by software application modules running on the Level 1 Gateway 411.

In the diagram of FIG. 5 and the following description thereof, "VIU" refers to the video information user or subscriber, and the acronym "LTI" represents the loop transport interface 300.

The service data functions application module provides real time access to the customer and the network. The service data functions also include accumulation and maintenance of service related data. In particular, the service data includes VIP related data and subscriber or VIU (video information user) related data. The VIP related data function stores service profile information (VIP identification code, sever port information, level 2 gateway signaling address, type of DET's serviced by each VIP's equipment, etc.) for each VIP and makes that information available to the service control functionality as needed. The VIU related data function stores subscriber service profile information for each end user and makes that data available to the service control functionality as needed. The user profile data may include information such as the type of DET, DET identifications (if necessary), global address and/or billing telephone number, signaling address, etc.

The second functional level performed by an application software module running in the Level 1 Gateway 411 relates to the service control functions of the network. This is the level at which most of the interactions with the VIP and the subscriber take place. As shown, these interactions between the Level 1 Gateway and the DET include personal options, event ordering, service activation, profile and subscription management, CPE software management, VIP directory/menu, authorization management and session agent.

Personal options permits a subscriber to customize certain video dial tone related options through direct interaction with the Level 1 Gateway 411. As discussed above, examples of personal options set up and modified through this interaction with the Level 1 Gateway include PIN numbers, VIP menus, and hours of service. Another personal option might allow the subscriber to specify certain times of the day or week when the network should permit access to certain broadcast or interactive services.

The event ordering interaction permits a subscriber to interact with the Level 1 Gateway to specify a pay per view event to be broadcast in the future which the user wants authorized in advance, to insure on-time reception. As part of this function, the Level 1 Gateway maintains event related data for the various broadcast VIP's and their respective events and interacts with the subscriber through the DET to inform the subscriber of upcoming events and receive event order inputs from the subscriber. The Level 1 Gateway 411 also signals the DET 100a at the appropriate time to at least notify the user and may instruct the DET to turn on and/or select the appropriate channel and digital video slot to receive and display the ordered event.

The service activation function permits the user to specify various levels of broadcast service that are to be provided to the subscriber through the subscriber's DET's. The profile and subscription management function is similar and related to the service activation function. The profile and subscription management application provides an automated means for the user to alter the user's profile and subscription information stored in the Level 1 Gateway. This software application submodule communicates relevant change information to necessary systems, e.g. CPE software management, session management and/or network management, to implement desired changes. For example, this application submodule can be used to change scrambling, encryption or interdiction status of a broadcast channel for the user. As another example, through the profile and subscription management function the Level 1 Gateway would interact with the subscriber to add service for a new DET at the subscriber's premises.

Under the CPE software management function, the Level 1 Gateway will download software needed by the DET for a particular call, if needed. Examples of such software downloaded from the Level 1 Gateway include customized broadcast channel maps, signaling protocol versions, and complete signaling protocols. Also, if the DET 100a is not capable of communicating with a VIP selected by the subscriber, the Level 1 Gateway 411 can download a translation program to the DET to convert messages compatible with the DET to and from message formats compatible with the VIP's equipment. Depending on the type of downloaded software, the downloading may occur only once at the time of installation, periodically or on an as-needed basis.

The VIP directory/menu application submodule presents an interface to the end user to navigate among video dial tone service features offered through the network. This application submodule presents the user with options, receives selections from the users and translates selections into service requests for processing by the session agent function application submodule. Options available to the user, in an initial preferred embodiment, include: establishing an internal session (within Level 1 Gateway) with a profile/subscription application, establishing an internal session (within Level 1 Gateway) with an event scheduling/ordering application, establishing an external session (with a level 2 gateway) to a particular interactive VIP, help functions, terminate a current session and resume an earlier interactive session (one of two maximum). For some VIP's, the VIP directory/menu application software may also provide menus of the particular VIP's services. For example, if one VIP offered video on demand, home shopping and home banking services, that VIP might have the Level 1 Gateway present the user with a menu of those services before actually proceeding to establish the session with that VIP's equipment. The VIP would have access to the menu data to update that data as needed.

The authorization management application submodule provides a generic authorization control capability that can be re-used across different ones of the services applications. This functionality would be separate and in addition to the PIN number functionality offered by the personal options.

The authorization management application software, for example, might be used to define a pass code to permit a subscriber access to the event scheduling/ordering application, particularly if the subscriber is paying for the ordered event by credit card.

The session agent function or application submodule of the Level 1 Gateway actually translates a subscriber's request to communicate with a particular VIP and that VIP's acceptance of the call from the subscriber into a command to the next level to take actions to set up the desired communication session. Specifically, the agent application maintains status information for each user session, whether the session has an external end-point to a VIP or an internal end point within the Level 1 Gateway (e.g. to the directory/menu application, the event scheduling/ordering application, etc.). The session agent application responds to various requests from the user, from the VIP, or from the application within the Level 1 Gateway to establish, modify or breakdown a session and provides appropriate instructions to the session manager application to actually establish, modify or breakdown sessions. In turn, the session agent functionality receives feedback from the session manger as to the results of the instructions and in response thereto provides reports to the end users and to the VIP's. The session agent application submodule controls which sessions are active at any time, from an end user perspective, and which if any sessions become active upon termination of an existing active session. For applications internal to the Level 1 Gateway, the session agent also effectively wakes up and terminates the relevant application. Another feature of the session agent application is that it provides a mechanism to notify the user of events, e.g. network failures. Finally, the session agent functionality provides billing related information to the billing system.

As seen from the above discussion, the service control functions provide commands to the next lower level functionality to start making and/or terminating the communication connections through the network. The next lower level functionality, the session management functions breaks down each session into each end-to-end connection required for that session. The session management software application module maintains addresses of the network interface points of all of the VIP servers and each user's DET. The session management module functionality responds to requests from the session agent application to establish and breakdown session, relates user and VIP identifiers to the appropriate addresses for their respective network interface points and converts each individual session between two network interface points into the individual connection links needed for that session. The session management application module then provides appropriate requests to the network connection management functionality to establish and break down the individual connections which make up a session, and the session management application module receives feedback on the results of those requests. The session management application also monitors the entire session to maintain status information regarding active system topologies, and this application collects the actual usage information and passes that information to the billing system.

The connection management application module also has access to addresses of the network interface points of all of the VIP servers and each user's DET as well as the addresses of the entry and exit points of each subnetwork. The connection management application breaks down each end-to-end connection identified by the session management functionality into all of the network subsystem elements needed to complete the connection. This application coordinates with the subnetwork controllers (PVC controller, video manager in LTI and ACC-4000D) to determine availability of necessary transport capability and issues requests with end point addresses for each network subsystem (VIP, VIU, PVC, LTI) for the requisite connectivity. Using this methodology, the connection management application module responds to requests from the session management function to establish and break down a connection between interface points of a VIP and an end user by providing corresponding requests to the relevant subnetwork controllers. The connection management application also receives feedback from the element management functionality applications performed by those controllers and notifies the service management application of events, such as failures.

Each element management function maps the course or route through the respective network subsystem and provides instructions to the relevant network elements to produce the actual connections. ATM element management is the function of the PVC controller 415, and routing through the loop transport interface (LTI) 300 and the hybrid fiber-coax distribution network to the individual DET's 100a is controlled by the video manager 417 and the video administration module (VAM) or ACC-4000D 331.

The ATM element management functionality maintains a view of allocated ATM connections and available resources across the ATM portion of the network. This functionality responds to commands from the connection management application of the Level 1 Gateway 411 to establish virtual circuits through the ATM portion of the network and provide corresponding instructions to the ATM switching elements. The ATM element management functionality also collects event and status data and aggregates traffic statistics through the ATM switching elements. Another function of the ATM element management application is to notify the connection management application of events, such as failures, in the ATM subnetwork.

The access subnetwork management applications performed by the video manager and the ACC-4000D respond to requests from the connection management application of the Level 1 Gateway 411 to establish both downstream video communications and two-way signaling communications over the hybrid fiber-coax distribution system. The channel and digital slot allocation functions of the video manager and the encryption/authorization control functions of the ACC-4000D have been discussed earlier, particularly with regard to operation of the network of FIG. 4.

The last element of the functional hierarchy stack depicted in FIG. 5 relates to the actual element functions. For the ATM subnetwork, this function is preformed by the ATM switch 401 which will provide switched ATM permanent virtual circuits for point to point connections from VIP's servers to ports of the packet handlers on the loop transport interfaces. As part of its operations, the ATM switch 401 will collect traffic statistics and monitor the status of its switch fabric and of individual connections. The ATM switch receives and responds to commands from the ATM portion of the element management function, i.e. from the PVC controller, to establish and tear down ATM connections and provides notice of various events (including failures) to the element management function. The actual element function for routing through the hybrid fiber-coax system to individual DET's is performed by the loop transport interface (LTI) and the descrambler functionality of the DET, as discussed above with regard to FIG. 4.

Although preferred embodiments of the Level 1 Gateway operation and digital video distribution networks using that Gateway in accord with the invention have been described in detail above, it should be clear that the present invention is capable of numerous modifications as would be apparent to one of ordinary skill in the art. For example, the detailed discussion of the Level 1 Gateway above assumed only data/signaling communications between that Gateway and the DET. Consequently selection menus, etc., from the Level 1 Gateway took the form of text and/or graphics. The Level 1 Gateway could transmit still frames of MPEG encoded video information through the signaling channel, or full motion video if a broadband port is provided to that Gateway. Also, the Level 1 Gateway need not be a stand alone device. The functionality of that Gateway may be combined with that of other network components, such as the SAM (FIG. 3) or the VAM (FIG. 4). Alternatively, in the networks of FIGS. 3 and 4, each HDT or Loop Transport Interface may be programmed to perform part of or all of the Level 1 Gateway functions. These and any other apparent modifications all fall within the purview of the appended claims.

We claim:

1. In a communication network selectively providing broadband communication links between servers operated by a plurality of service providers and a plurality of subscriber terminals, a method comprising:

receiving a selection of one of the service providers at a gateway control element of the network from one of the subscriber terminals;

controlling the broadband communication network to attempt to establish a broadband communication link through the network between a server operated by the selected service provider and the subscriber's terminal;

determining that the broadband communication link can not be established through the network;

transmitting a message indicating inability to establish the broadband communication link to the subscriber's terminal; and in response to the transmitted message, providing a notice to the subscriber.

2. A method as in claim 1, wherein if the inability to establish the communication link was caused by all ports of the server operated by the selected service provider being in use, the notice provided to subscriber indicates that the selected provider is unavailable.

3. A method as in claim 1, wherein if other servers operated by other service providers are currently available to the subscriber, the notice provided to subscriber suggests that the subscriber select another service provider.

4. A method as in claim 1, wherein the step of providing notice comprises visually displaying the notice to subscriber.

5. A method as in claim 1, wherein the established broadband communication link provides downstream transport for digitized and compressed audio/video information from the broadband server to the subscriber's terminal for presentation to the subscriber.

6. In a communication network selectively providing broadband communication links between servers operated by a plurality of service providers and a plurality of subscriber terminals, a method comprising:

receiving a selection of one of the service providers at a gateway control element of the network from one of the subscriber terminals;

controlling the broadband communication network to attempt to establish a broadband communication link through the network between a server operated by the selected service provider and the subscriber's terminal;

monitoring status of the established broadband communication link; and upon detecting occurrence of a fault or interruption in the established broadband communication link, transmitting a message indicating a fault or interruption to the subscriber's terminal; and in response to the transmitted message, providing a notice of the fault or interruption to the subscriber.

7. A method as in claim 6, wherein the step of providing notice comprises visually displaying the notice to subscriber.

8. A method as in claim 6, wherein the established broadband communication link provides downstream transport for digitized and compressed audio/video information from the broadband server to the subscriber's terminal for presentation to the subscriber.

9. A system comprising:

a communication network selectively providing broadband communications links;

a plurality of information service provider systems connected to the network, each provider system being capable of transmitting broadband digital information via a communication link through the network;

a plurality of terminals for transmitting control signals upstream through the network in response to user inputs and for providing displays in response to information received through the network;

controller means for controlling establishment of broadband communication links through the broadband communication network between the information service provider systems and the terminals; and a gateway instructing said controller means to establish links in response to requests from subscriber terminals and responsive to notification from the controller means that a link to a specific terminal can not be established or is subject to a fault or interruption for providing notice to said specific terminal.

10. In a system comprising:

a communication network selectively providing broadband communications links;

a plurality of information service provider systems connected to the network, each provider system being capable of transmitting broadband digital information via a communication link through the network;

a plurality of terminals for transmitting control signals upstream through the network in response to user inputs and for providing displays in response to information received through the network; and controller means for controlling establishment of broadband communication links through the network between the information service provider systems and the terminals;

a gateway for:
 (1) instructing said controller means to establish identified links in response to requests from subscriber terminals,
 (2) receiving notification from the controller means that a link between a selected provider's system and a specific terminal can not be established or is subject to a fault or interruption, and
 (3) providing notice to said specific terminal that the link between the selected provider's system and the specific terminal can not be established or is subject to a fault or interruption.

11. A communication method comprising:

receiving a request for service from a subscriber's terminal at a level 1 gateway control element of a broadband communication network;

in response to the request for service, generating menu information listing a plurality of broadband information service providers available through the broadband digital communication network;

transmitting said menu information from the level 1 gateway to the terminal;

visually displaying the menu to the subscriber;

receiving a selection of a service provider listed on the menu from the subscriber's terminal at the level 1 gateway;

transmitting a query message from the level 1 gateway for a level 2 gateway operated by the selected service provider identifying the subscriber's terminal;

if the level 2 gateway is ready to accept communications from the subscriber's terminal:
 (1) establishing a narrowband signaling communication between the level 2 gateway and the subscriber's terminal,
 (2) establishing a broadband digital communication though the network between a broadband server associated with the level 2 gateway and the subscriber's terminal,
 (3) transmitting digitized, compressed audio/video information through the established broadband communication from the broadband server to the subscriber's terminal; and if the level 2 gateway is not ready to accept communications from the subscriber's terminal:
 (a) transmitting a notification message to the subscriber's terminal, and
 (b) displaying the notification message to the subscriber.

* * * * *